(12) United States Patent
Lu et al.

(10) Patent No.: US 11,836,712 B2
(45) Date of Patent: Dec. 5, 2023

(54) METHOD AND DEVICE FOR CREATING SECURE CHANNEL FOR DIGITAL CURRENCY HARDWARE

(71) Applicant: Feitian Technologies Co., Ltd., Beijing (CN)

(72) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 489 days.

(21) Appl. No.: 17/265,419

(22) PCT Filed: Aug. 5, 2019

(86) PCT No.: PCT/CN2019/099260
§ 371 (c)(1),
(2) Date: Feb. 2, 2021

(87) PCT Pub. No.: WO2020/034860
PCT Pub. Date: Feb. 20, 2020

(65) Prior Publication Data
US 2021/0319435 A1     Oct. 14, 2021

(30) Foreign Application Priority Data
Aug. 15, 2018   (CN) .......................... 201810931296.7

(51) Int. Cl.
*H04L 9/00*       (2022.01)
*G06Q 20/36*      (2012.01)
(Continued)

(52) U.S. Cl.
CPC ....... *G06Q 20/3674* (2013.01); *G06Q 20/389* (2013.01); *G06Q 20/4014* (2013.01); *H04L 63/0428* (2013.01); *H04L 63/062* (2013.01)

(58) Field of Classification Search
CPC ............. H04L 63/062; H04L 63/0428; G06Q 20/4014; G06Q 20/389; G06Q 20/3674
(Continued)

(56) References Cited

U.S. PATENT DOCUMENTS 5,996,076 A * 11/1999 Rowney ................. G06Q 20/12
705/76
11,188,901 B2 * 11/2021 Karpenko ............ G06Q 20/401
(Continued)

*Primary Examiner* — Josnel Jeudy
(74) *Attorney, Agent, or Firm* — Hammer & Associates, P.C.

(57) ABSTRACT

A method for creating a secure channel for updating a digital currency hardware wallet application: upon receiving a security operation execution instruction, obtaining a public key and a certificate number of a host computer from within the security operation execution instruction, obtaining a corresponding certificate of the host computer according to the certificate number, and verifying the certificate of the host computer using the public key of the host computer; when receiving a verification instruction, obtaining the public key of the host computer according to a key version number and a key ID in the verification instruction, generating a receipt according to a temporary public key of the host computer, the public key of the host computer and a generated session key which are in the verification instruction, and sending the receipt to the upper computer; upon receiving the application update instruction, using the session key to decrypt application data ciphertext in the application update instruction, and updating the saved application data using the successfully decrypted application data. By using the digital currency hardware wallet of the present invention, it is possible to prevent the wallet from being attacked, stolen or tampered with, mutual verification of communication parties may be carried out, and encryption and verification are carried out to ensure data privacy and integrity.

10 Claims, 11 Drawing Sheets

(51) Int. Cl.
*G06Q 20/38* (2012.01)
*G06Q 20/40* (2012.01)
*H04L 9/40* (2022.01)

(58) Field of Classification Search
USPC .......................................................... 713/150
See application file for complete search history.

(56) References Cited

U.S. PATENT DOCUMENTS

| | | | |
|---|---|---|---|
| 2005/0204164 A1* | 9/2005 | Kakii | H04L 9/3268 726/5 |
| 2013/0304651 A1* | 11/2013 | Smith | G06Q 20/3227 380/284 |
| 2018/0227293 A1 | 8/2018 | Urh et al. | |

* cited by examiner

347: parses the data field content of the internal authenticating instruction according to the current security level to obtain a parsed result, stores the parsed result into the receiving cache, and obtains the key version number and the key ID from the receiving cache 348: obtains the control applet template consulted by the key and the upper computer temporary public key from the receiving cache 349: generates the device temporary key pair, searches for the public key of the upper computer itself according to the key version number and the key ID, uses the upper computer temporary public key to consult with the private key of the device itself to generates the first shared private key, and uses the upper computer temporary public key to consult with the generated device temporary private key to generate the second shared private key 350: uses the derive algorithm to generate the shared information according to the first shared private key and the second shared private key 351: uses the preset algorithm to generate the session key according to the first shared private key, the second shared private key and the shared information 352: generates the receipt input data according to the key consultation reference control template, the upper computer temporary public key and the device temporary public key, and generates the receipt according to the receipt input data and the session key 353: generates the response data according to the receipt and the device temporary public key, and packages the response data according to the current security level and returns the packaged response data to the upper computer Step 301

Fig. 10

METHOD AND DEVICE FOR CREATING SECURE CHANNEL FOR DIGITAL CURRENCY HARDWARE

FIELD OF THE INVENTION

The present invention relates to a digital wallet, specifically to a method for building a security channel for updating an applet of a digital currency hardware wallet and a device therefor.

PRIOR ART

In recent years, with emergence of a digital currency (e-money), people have gradually become accustomed to and rely on the e-money. Now everyone's wallet basically has several pieces of digital consumption cards (e-cards) or bank credit cards. Thus, a bank card has become a carrier of user identification and transaction participation.

Digital currency is a substitute currency of electronic currency. Digital gold coin and cryptocurrency belong to digital currency. It is different from a virtual currency in a virtual world, because it can be used for real goods and service transactions, not limited to online games. At present, the central bank does not recognize and issue any digital currency, and the digital currency does not necessarily have a benchmark currency. It is now defined as a virtual commodity. At present, the popular digital currencies include bitcoin, letcoin, and maker coin, etc., they all belong to wallet currency, have some software wallet, adopts the block chain technology which can be decentralized, and have practical applications.

However, due to the characteristics of any pure software, security of any software wallet is relatively low. If the software wallet fails to have a back up, when the computer system goes out of order, it is easy to lose the wallet data, and it is easy for the wallet balance to be stolen. The way to solve such a problem is to use a hardware wallet. The so-called "hardware wallet" refers to storing a private key of digital assets in a single chip, being isolated from the Internet, and being used in a way of plug and play. In the digital currency hardware wallet application, it is necessary to update the wallet applet remotely. In order to solve the problem of remote applet update, prevent from being attacked, and solve the problems of identity authentication between a mobile device and server, and integrity and privacy of data transmission, it is urgent to provide a secure channel for an applet update.

SUMMARY OF THE INVENTION

The object of the present disclosure is to provide a method and a device for building a security channel for updating an applet of a digital currency hardware wallet, in which the digital currency hardware wallet can be prevented from being attacked, filched or falsified; the communicating parties can be authenticated by each other; the completion of the communication data can be made sure by using MAC; the encryption and the validation can be performed so as to make the data private and complete.

Thus, according to one aspect of the present invention, there is provided a method for building a security channel for updating an applet of a digital currency hardware wallet, which includes:

Step S1, when receiving an instruction sent from an upper/host computer, a hardware wallet determines a type of the instruction, executes Step S2 in the case that the instruction is an obtaining data instruction; executes Step S5 in the case that the instruction is an executing a security operation instruction; executes Step S6 in the case that the instruction is a verifying instruction; and executes Step S7 in the case that the instruction is an applet updating instruction;

Step S2, determining a type of the data which is obtained according to the obtaining data instruction, executing Step S3 in the case that the data is an obtaining key information; while executing Step S4 in the case that the data is an obtaining device certificate information:

Step S3, obtaining and storing a key version and key identification which correspond to a key set according to key set identification in the obtaining data instruction, and returning the key version and the key identification to the upper computer, and returning to Step S1;

Step S4, searching for a corresponding certificates-set according to the certificates-set identification in the obtaining data instruction, traversing upper certificates from the certificates set to found a root certificate, storing, in sequence, certification content of all certificates from the root certificate, and returning the content of all certificates to the upper computer, and returning Step S1;

Step S5, obtaining a public key of the upper computer itself and a certificate serial number from an executing security operation instruction, obtaining the certificate of corresponding upper computer according to the certificate serial number, using the public key of the upper computer itself to verify the certificate of the upper computer, storing the key of the upper computer in the case that the certificate of the upper computer is verified successfully, then returning a successful response to the upper computer, and returning to Step S1; otherwise, returning an error information to the upper computer;

Step S6, obtaining the public key of the upper computer itself according to the key version number and the key ID in a verifying instruction, generating a receipt according to a temporary public key of the upper computer in the verifying instruction, the public key of the upper computer and a session key which is generated, and sending the receipt to the upper computer, then returning to Step S1; and Step S7, using the session key to descript applet data cipher text in an applet updating instruction, and using the obtained applet data during the said description to update the stored applet data, and returning an updating successful information to the upper computer, then returning to Step St.

According to the other aspect of the present invention, there is provided a device for building a security channel for updating an applets of a digital currency hardware wallet, which comprises:

a first receiving module, which is configured to receive an instruction from an upper computer:

a first determining module, which is configured to determine a type of the instruction received by the first receiving module, to trigger a second determining module in the case that the instruction is an obtaining data instruction; to trigger a verifying and storing module in the case that the instruction is an executing security operation instruction; to trigger an obtaining and generating module in the case that the instruction is a verifying instruction; and to trigger an encrypting and updating module in the case that the instruction is an applet updating instruction;

the second determining module which is configured to determine a type of the data which is being obtained according to the obtaining data instruction, to trigger an obtaining and storing module in the case that the data is obtaining key information; to trigger the searching and storing module in the case that the data is obtaining device certificate information;

the obtaining and storing module, which is configured to obtain and store key version and key identification from the corresponding keys set according to the keys set identification in the obtaining data instruction;

a first sending module, which is configured to return the key version and the key identification which are stored by the obtaining and storing module to the upper computer, and to trigger the first receiving module;

the searching and storing module, which is configured to search for a corresponding certificates set according to a certificates set identification in the obtaining data instruction, to traverse upper certificates from the certificates set to find a root certificate, and to store certificate contents of all the certificates which is started from the root certificate;

a second sending module, which is configured to return the contents of all the certificates stored in the searching and storing module to the upper computer, and to trigger the first receiving module;

the verifying and storing module, which is configured to obtain public key of the upper computer itself and certificate serial number from the executing security operation instruction, to obtain the corresponding certificate of upper computer according to the certificate serial number, to use the public key of the upper computer to verify the certificate of upper computer, and to store the key of the upper computer in the case that the certificate of upper computer is verified successfully;

a third sending module, which is configured to return a successful response to the upper computer in the case that the certificate of upper computer is verified successfully by the verifying and storing module; is further configured to return the error information to the upper computer in the case that the certificate of upper computer is verified unsuccessfully by the verifying and storing module;

the obtaining and generating module which is configured to obtain the public key of the upper computer according to the key version number and the key ID in the verifying instruction, and to generate a receipt according to a temporary public key of the upper computer in the verifying instruction, the public key of the upper computer and a generated session key;

a fourth sending module which is configured to send the receipt generated by the obtaining and generating module to the upper computer, and to trigger the first receiving module;

the decrypting and updating module which is configured to use the session key to decrypt the applet data in the applet updating instruction so as to obtain applet data, and to use the applet data to update the stored applet data; and a fifth sending module which is configured to return updating successful information to the upper computer after the decrypting and updating module uses the applet data obtained from decrypting updates the stored applet data successfully, and to trigger the first receiving module.

Compared with the prior art, the technical solutions for building a security channel of updating the applet of the digital currency hardware wallet according to the present invention can prevent the digital currency hardware wallet from being attacked, stolen or tampered with by means of mutual verification from communication parties, complete communication data made sure by MAC, and encryption and verification, so as to ensure data privacy and integrity.

BRIEF DESCRIPTION OF THE DRAWINGS

FIGS. 7-10 are a flow diagram of a method for building a security channel for updating a digital currency hardware wallet applet according to Embodiment 4;

BEST MODES TO CARRY OUT THE INVENTION

The technical solution in the Embodiments of the present invention is further described more clearly and completely with the drawings of the present invention. Apparently, Embodiments described herein are just a few Embodiments of the present invention. On the basis of Embodiments of the invention, all other related Embodiments made by those skilled in the art without any inventive work belong to the scope of the invention.

Embodiment 1

Figure 1:
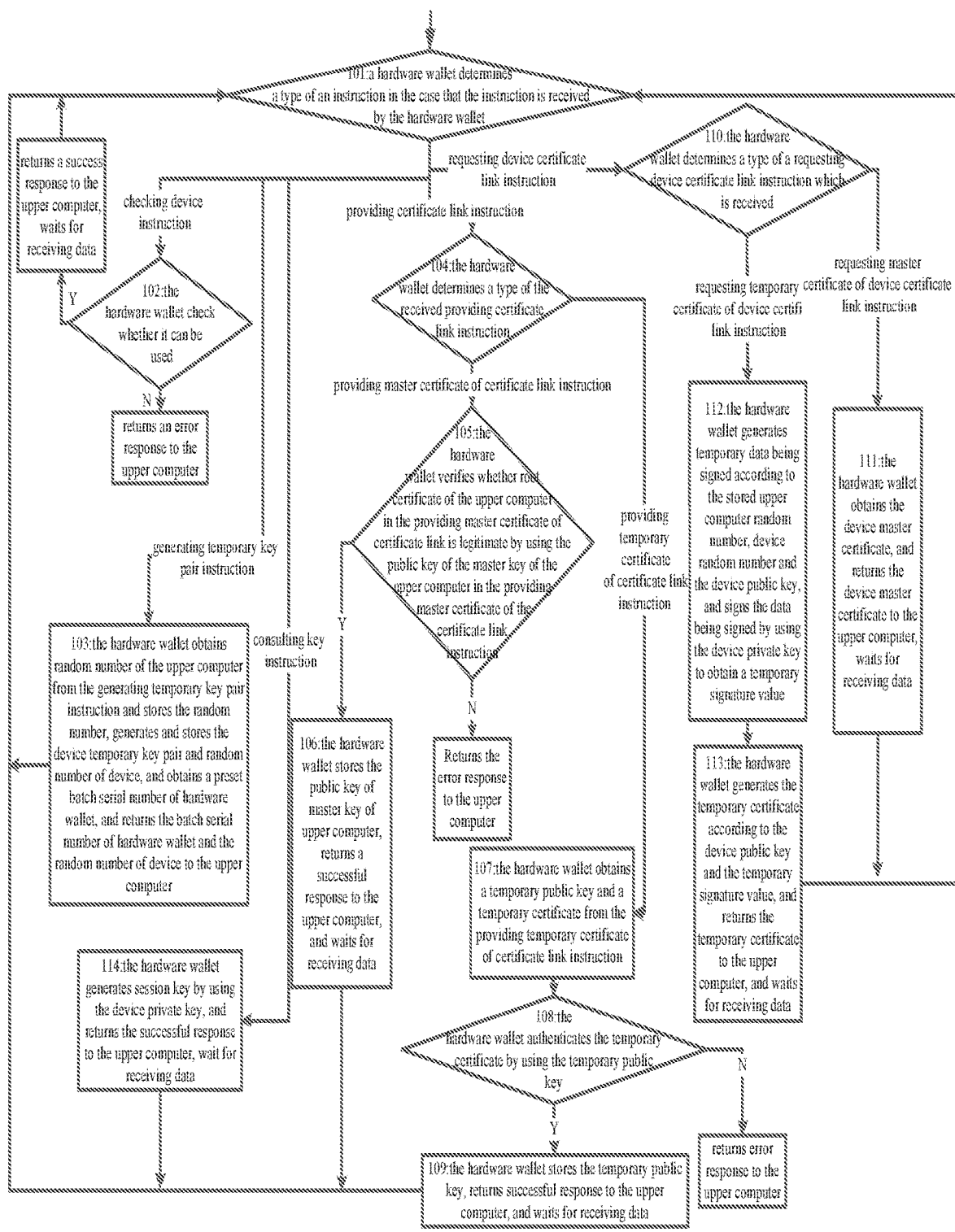
FIG. 1 is a flow diagram of a method for building a security channel for updating a digital currency hardware wallet applet according to Embodiment 1 of the present invention.

According to Embodiment 1, it provides a method for building a security channel for updating a digital currency hardware wallet applet, as shown in FIG. 1, comprising the following steps.

Step 101, a hardware wallet determines a type of an instruction in the case that the instruction is received by the hardware wallet, executes Step 102 in the case that the instruction is a checking device instruction; executes Step 103 in the case that the instruction is a generating temporary key pair instruction; executes Step 104 in the case that the instruction is a providing certificate link instruction; executes Step 110 in the case that the instruction is a requesting device certificate link instruction; and executes Step 114 in the case that the instruction is a consulting key instruction.

Specifically, the determining the type of the instruction is that determining data on the second byte of the instruction, the instruction is the checking device instruction if the data on the second byte is 04; the instruction is the generating temporary key pair instruction if the data is 50; the instruction is the providing certificate link instruction if the data is 51; the instruction is the requesting device certificate link instruction if the data is 52; and the instruction is the consulting key instruction if the data is 53.

Step 102, the hardware wallet check whether it can be used, if yes, returns a success response to the upper computer, waits for receiving data, and returns to Step 101; otherwise, returns an error response to the upper computer.

Preferably, in Embodiment 1, Step 102 specifically is that the hardware wallet obtains device ID from the checking device instruction, determines whether the obtained device ID matches the device and whether the hardware wallet can be used, if yes, returns the success response to the upper computer; otherwise, returns the error response to the upper computer; and the hardware wallet obtaining the device ID from the checking device instruction specifically is obtaining the device ID from the third byte to the sixth byte of the checking device instruction.

Step 103, the hardware wallet obtains a random number of the upper computer from the generating temporary key pair instruction and stores the random number, generates and stores the device temporary key pair and random number of device, obtains a preset batch serial number of hardware wallet, and returns the batch serial number of hardware wallet and the random number of device to the upper computer, then returns to Step 101.

Step 104, the hardware wallet determines a type of the received providing certificate link instruction, executes Step 105 if the instruction is a providing master certificate of certificate link instruction; while executes Step 107 if the instruction is a providing temporary certificate of certificate link instruction.

Specifically, in Embodiment 1, Step 104 includes that the hardware wallet determines the data on the third byte of the providing certificate link instruction, the received instruction is the providing master certificate of certificate link instruction if the data is 00; the received instruction is the providing temporary certificate of certificate link instruction if the data is 80.

Step 105, the hardware wallet verifies whether root certificate of the upper computer in the providing master certificate of certificate link is legitimate by using the public key of the master key of the upper computer in the providing master certificate of the certificate link instruction, if yes, executes Step 106; otherwise, returns an error response to the upper computer.

Specifically, in Embodiment 1, Step 105 includes that the hardware wallet obtains the public key of the master key of the upper computer and the root certificate of the upper computer from the providing master certificate of certificate link instruction, operates hash algorithm on data being signed in the root certificate of the upper computer to obtain a first hash value, decrypts the signature value of the root certificate by using the public key of master key of upper computer to obtain a first decryption value, determines whether the first hash value is same as the first decryption value, if yes, the root certificate is legitimate; otherwise, the root certificate is illegitimate.

Step 106, the hardware wallet stores the public key of master key of upper computer, returns a successful response to the upper computer, and waits for receiving data, and returns to Step 101.

Step 107, the hardware wallet obtains a temporary public key and a temporary certificate from the providing temporary certificate of certificate link instruction.

Step 108, the hardware wallet authenticates the temporary certificate by using the temporary public key, executes Step 109 in the case that the temporary certificate is authenticated successfully; otherwise, returns error response to the upper computer.

Specifically, in Embodiment 1, Step 108 includes that the hardware wallet operates hash algorithm on the data being signed in the temporary certificate to obtain a second hash value, decrypts the signature value of the temporary certificate by using the public key of the temporary key to obtain a second decryption value, determines whether the second hash value is same as the second decryption value, if yes, the temporary certificate is legitimate; otherwise, the temporary certificate is illegitimate.

Step 109, the hardware wallet stores the temporary public key, returns successful response to the upper computer, and waits for receiving data, and returns to Step 101.

Step 110, the hardware wallet determines a type of a requesting device certificate link instruction which is received, executes Step 111 in the case that the instruction is a requesting master certificate of device certificate link instruction; while executes Step 112 in the case that the instruction is a requesting temporary certificate of device certificate link instruction.

Specifically, in Embodiment 1, Step 110 includes that the hardware wallet determines data at the third byte of the requesting device certificate link instruction, the received instruction is the requesting master certificated of the device certificate instruction if the data is 00; the received instruction is the request temporary certificate of device certificate link instruction if the data is 80.

Step 111, the hardware wallet obtains the device master certificate, and returns the device master certificate to the upper computer, waits for receiving data, and returns to Step 101.

Step 112, the hardware wallet generates temporary data being signed according to the stored upper computer random number, device random number and the device public key, and signs the data being signed by using the device private key to obtain a temporary signature value.

Step 113, the hardware wallet generates the temporary certificate according to the device public key and the temporary signature value, and returns the temporary certificate to the upper computer, and waits for receiving data, and returns to Step 101.

Step 114, the hardware wallet generates session key by using the device private key, and returns the successful response to the upper computer, wait for receiving data, and returns to Step 101.

Embodiment 2

Figure 2:
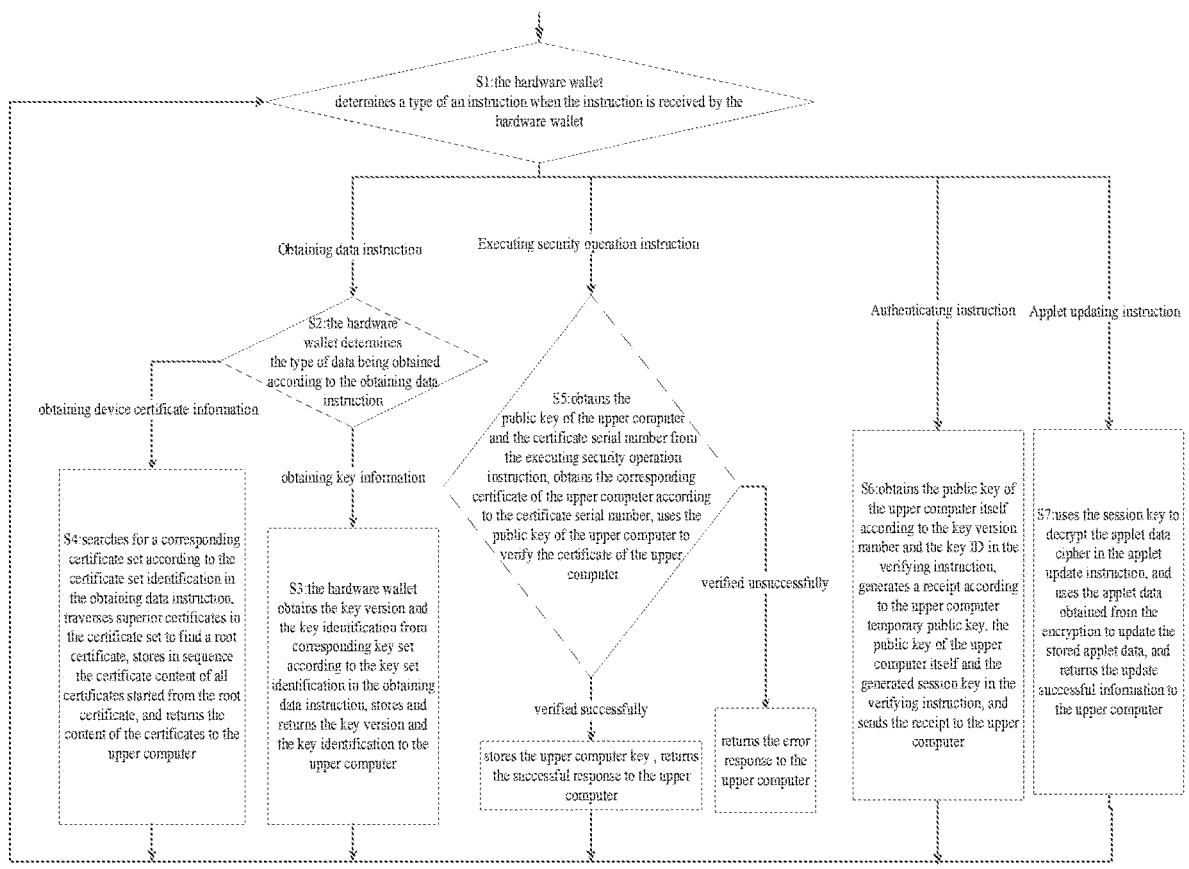
FIG. 2 is a flow diagram of a method for building a security channel for updating a digital currency hardware wallet applet according to Embodiment 2 of the present invention.
Figure 3:
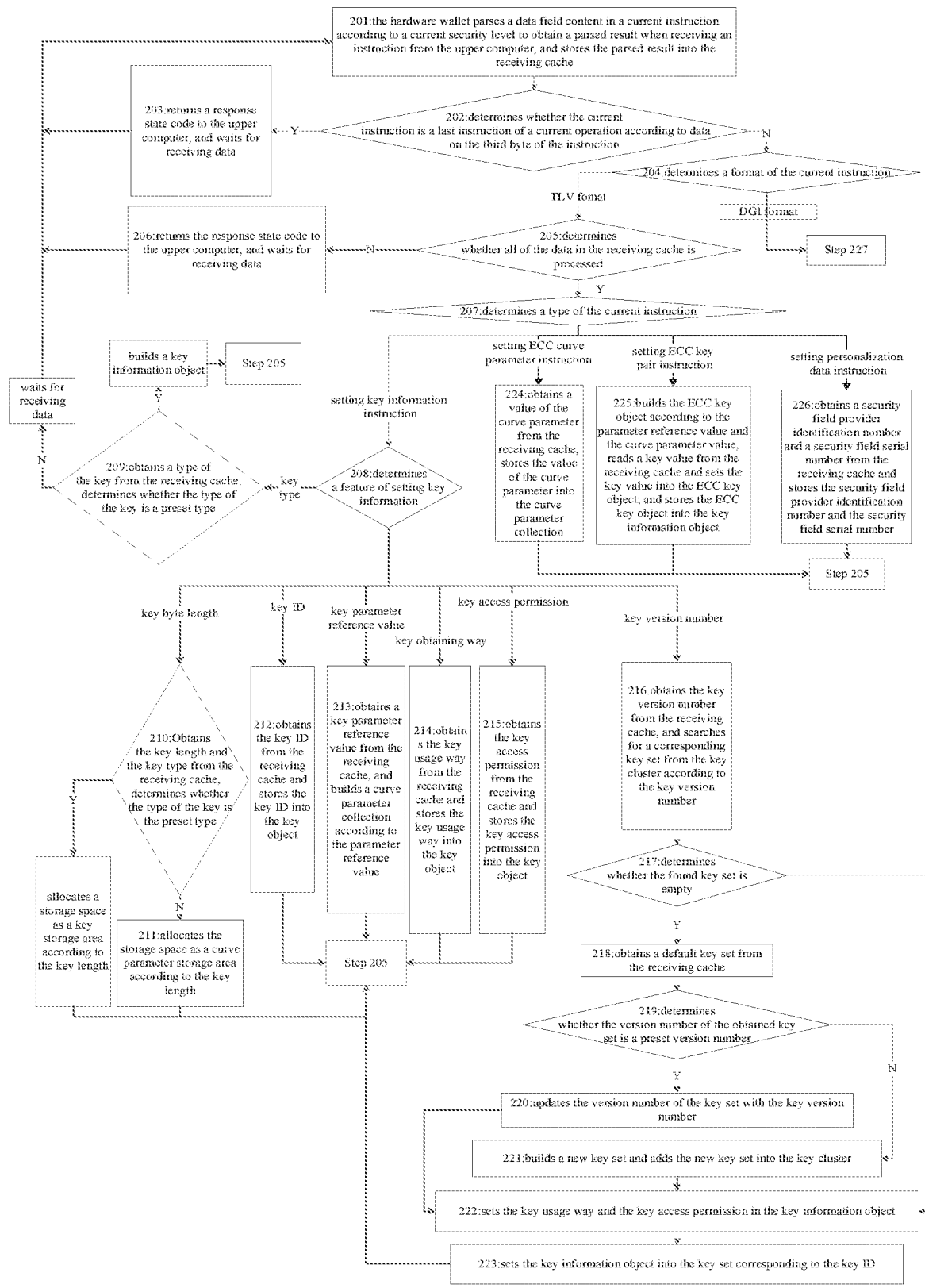
FIGS. 3-6 are a flow diagram of a process of personal setting before the method for building a security channel for updating a digital currency hardware wallet applet according to Embodiment 3.
Figure 4:
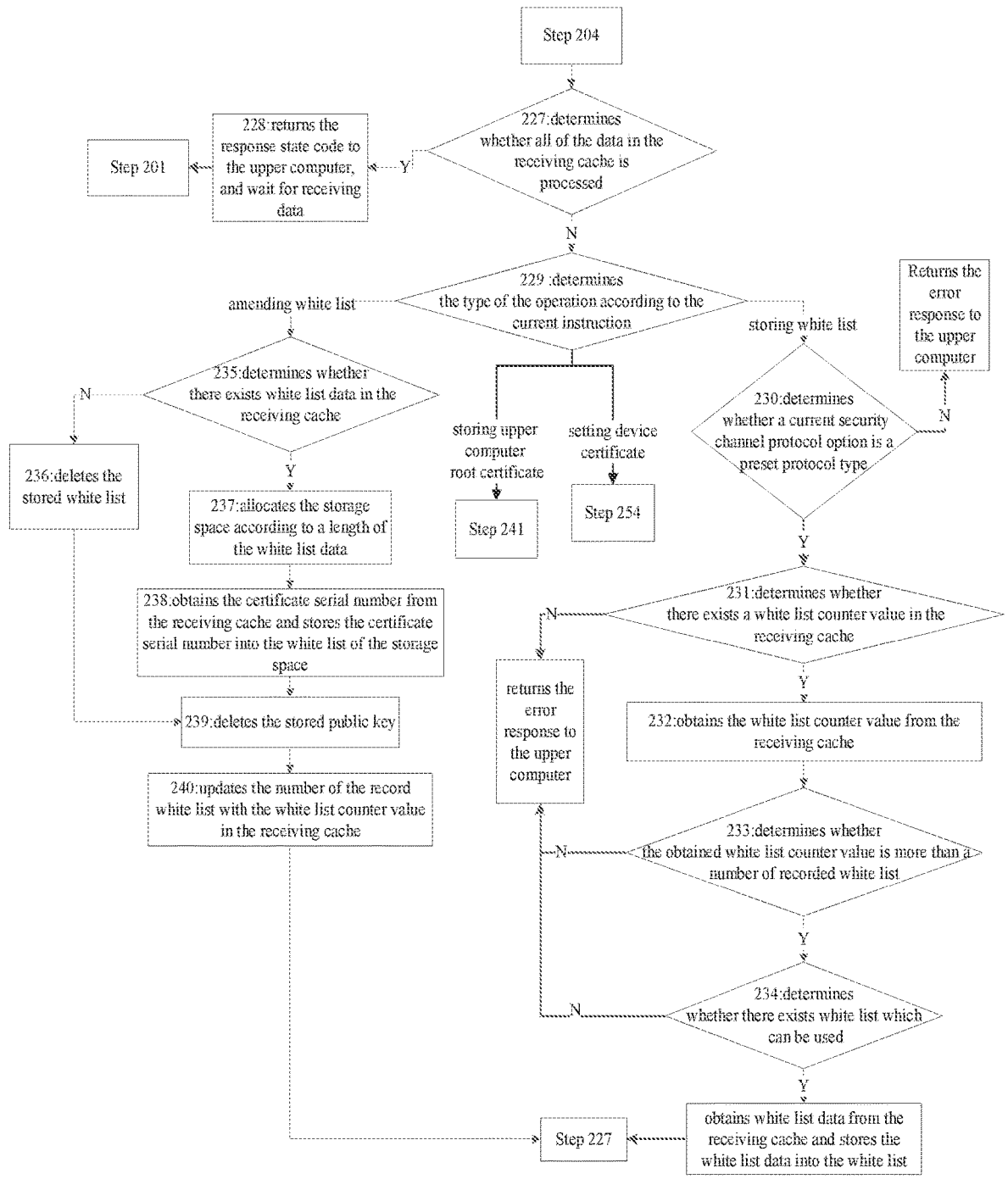
Figure 5:
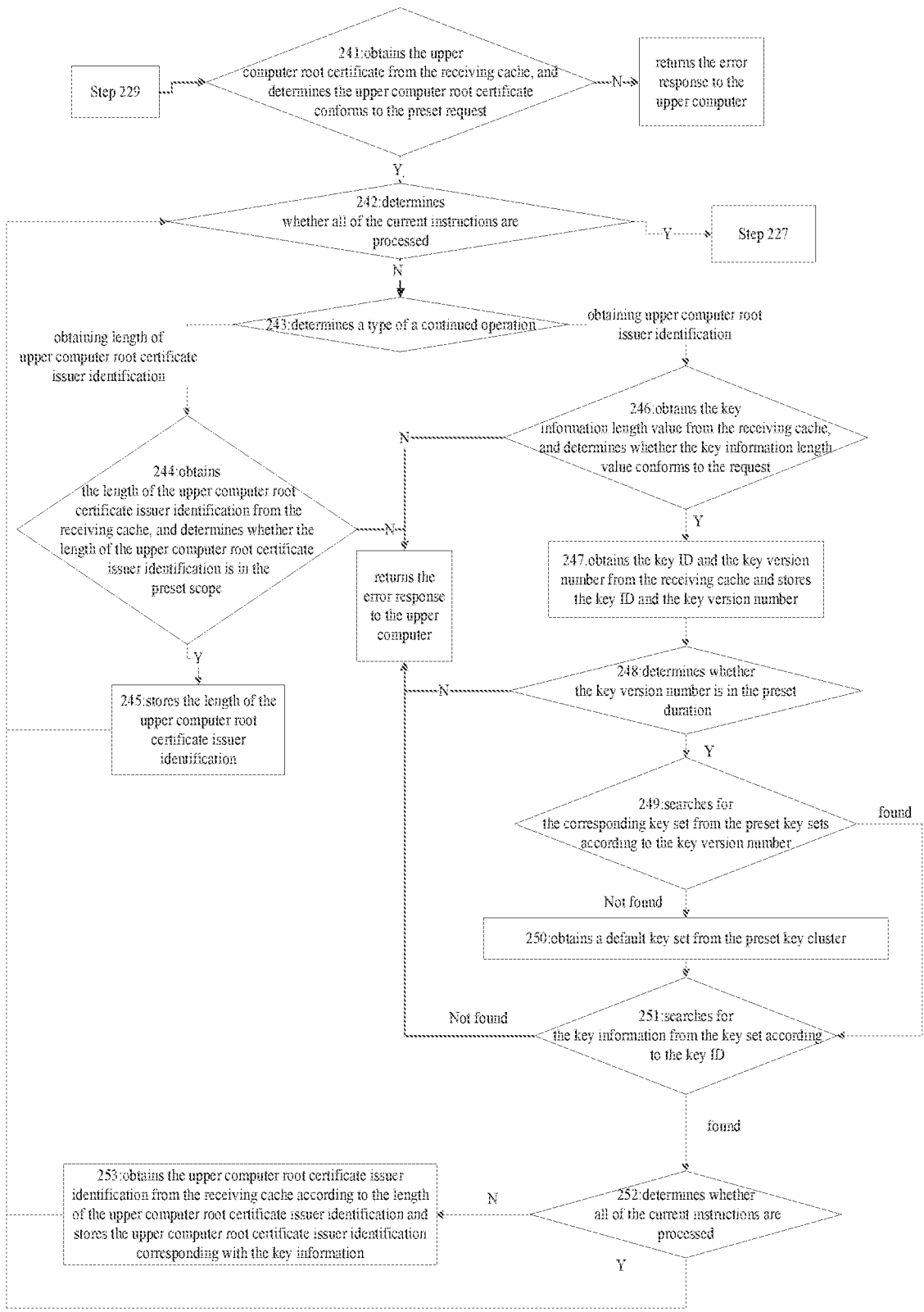
Figure 6:
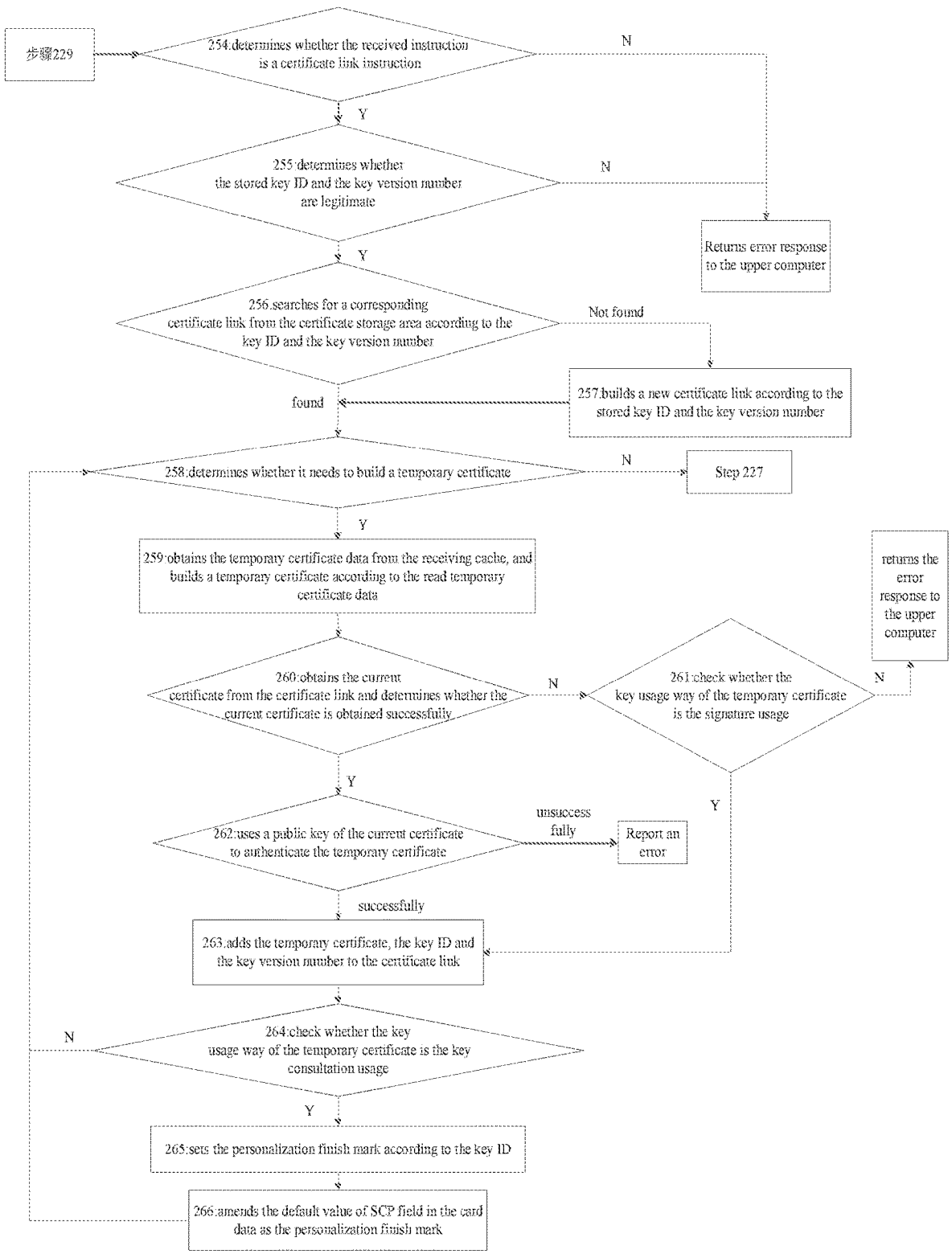
Figure 7:
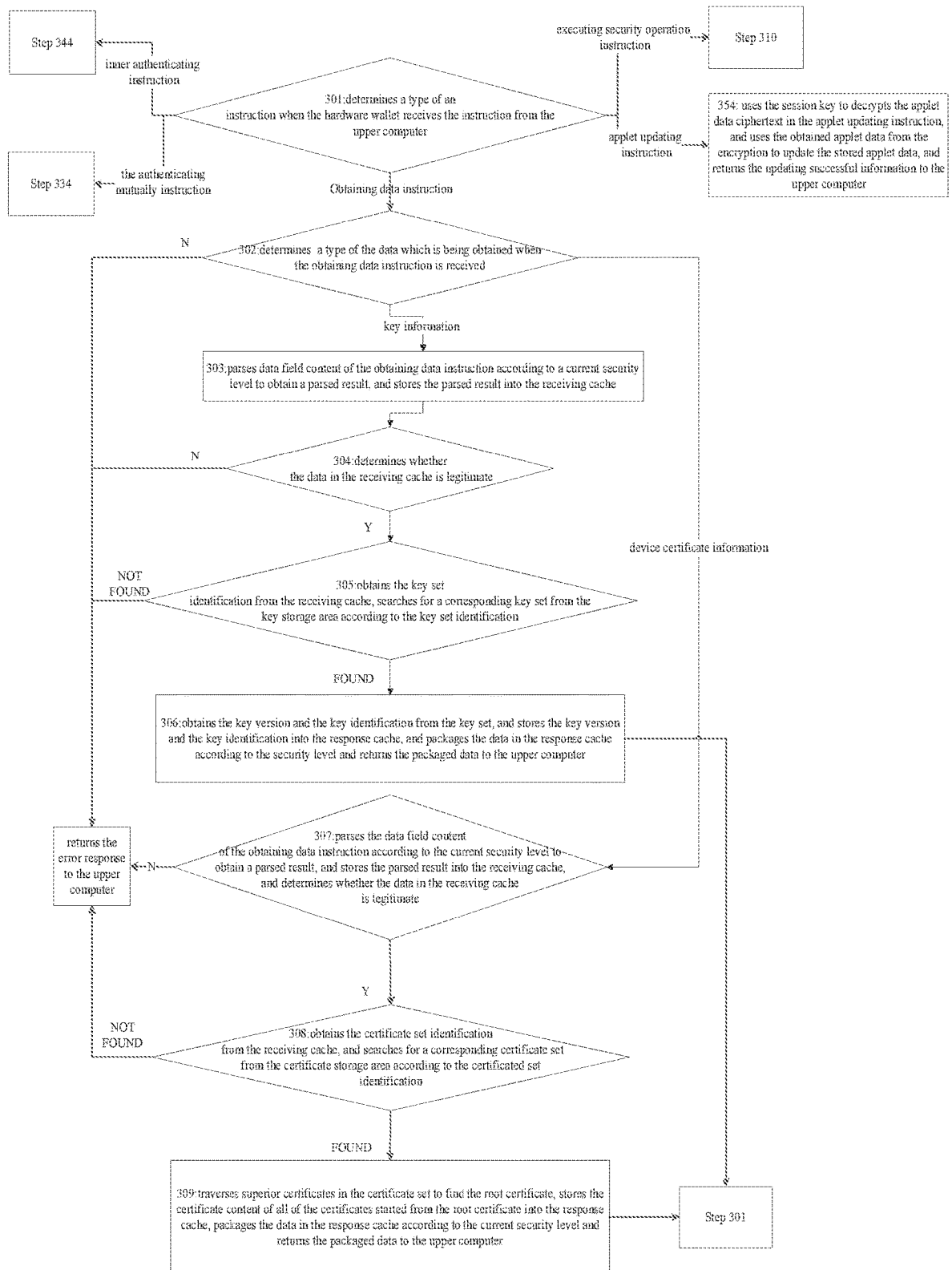
Figure 8:
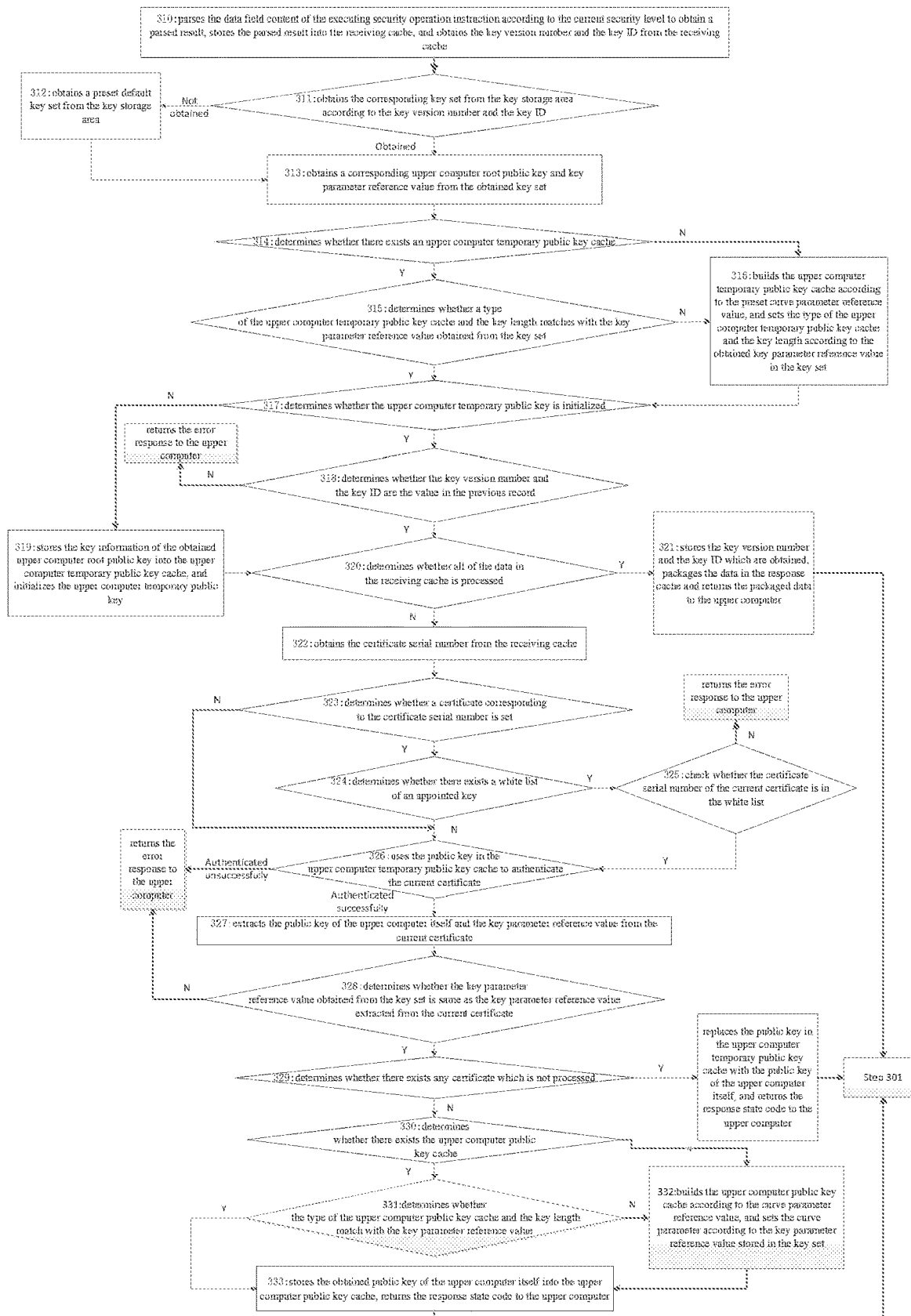
Figure 9:
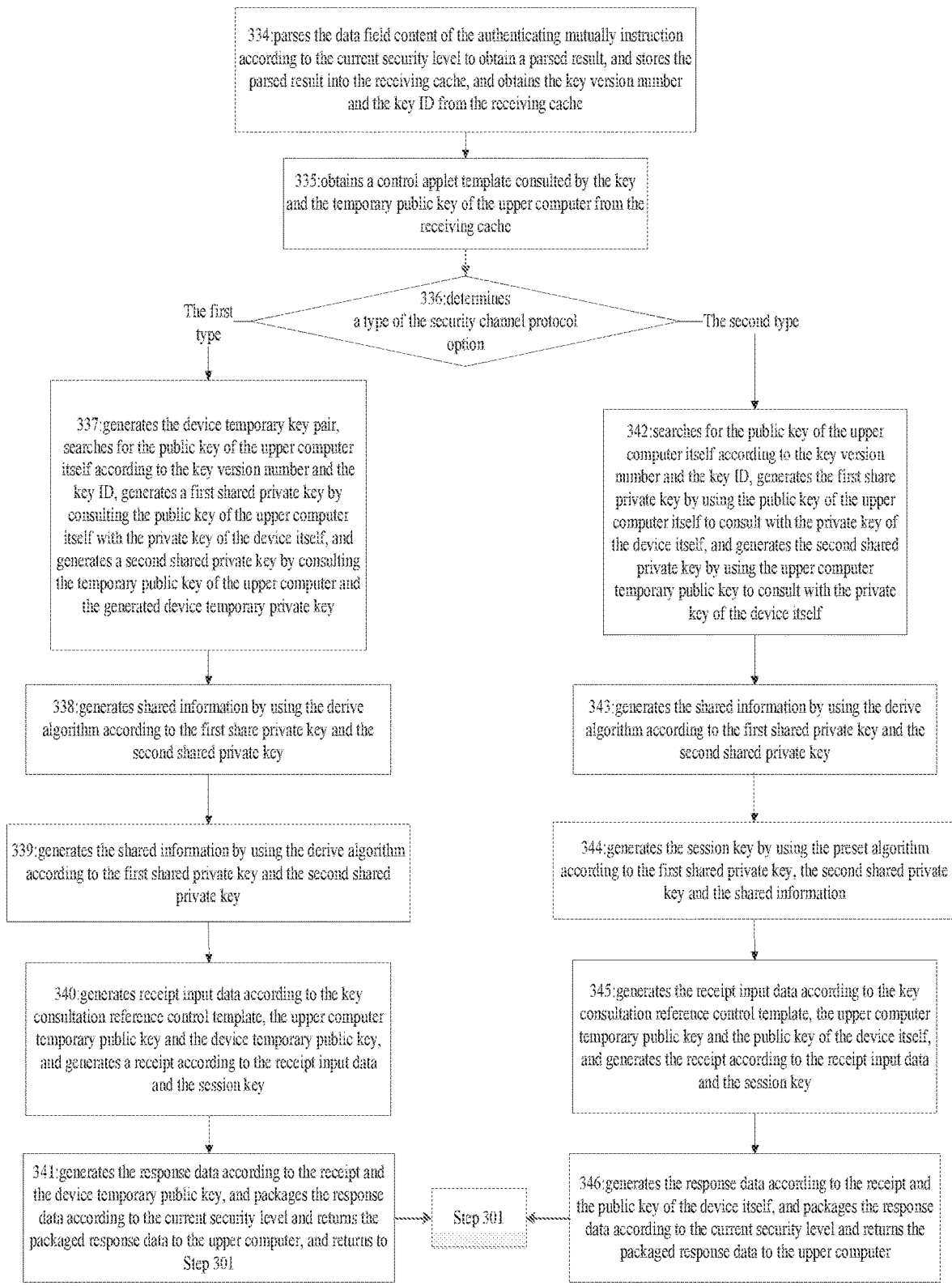

According to Embodiment 2 of the present invention, it provides a method for building a security channel for updating a digital currency hardware wallet applet, as shown in FIG. 2, which includes the following steps.

Step S1, the hardware wallet determines a type of an instruction when the instruction is received by the hardware wallet, executes Step S2 in the case that the instruction is an obtaining data instruction; executes Step S5 in the case that the instruction is an executing security operation instruction; executes Step S6 in the case that the instruction is a verifying instruction; and executes Step S7 in the case that the instruction is an applet updating instruction.

Step S2, the hardware wallet determines the type of data being obtained according to the obtaining data instruction, executes Step S3 in the case of the data is obtaining key information; and executes Step S4 in the case of the data is obtaining device certificate information.

Step S3, the hardware wallet obtains the key version and the key identification from corresponding key set according to the key set identification in the obtaining data instruction, stores and returns the key version and the key identification to the upper computer, and returns to Step S1.

Preferably, in Embodiment 2, Step S3 includes:

Step S31, the data field content of the received obtaining data instruction is parsed according to the current security level and a result is stored in the receiving cache;

Step S32, determines whether the data in the receiving cache is legitimate, if yes, executes Step S33; otherwise, returns error response to the upper computer;

Step S33, obtains the key set identification from the receiving cache, searches for a corresponding key set from the key storage area according to the key set identification, executes Step S34 in the case that the responding key set is found; otherwise, returns error response to the upper computer; and Step S34, obtains the key version and the key identification from the key set, and stores the key version and the key identification into the response cache, packages the data in the response cache according to the security level and returns the data to the upper computer, and returns to Step S1.

Step S4, searches for a corresponding certificate set according to the certificate set identification in the obtaining data instruction, traverses superior certificates in the certificate set to find a root certificate, stores in sequence the certificate content of all certificates from the root certificate, and returns the content of the certificates to the upper computer, then returns to Step S1.

Preferably, in Embodiment 2, Step S4 includes:

Step S41, parses the data field content in the received obtaining data instruction according to the current security level and stores the parsing result in the receiving cache, and determines whether the data in the receiving cache is legitimate, if yes, executes Step S42; otherwise, returns error response to the upper computer;

Step S42, obtains the certificate set identification from the receiving cache, searches for the corresponding certificate set from the certificate storage area according to the certificate set identification, executes Step S43 if the corresponding certificate set is found; otherwise, returns error response to the upper computer; and Step S43, traverses the superior certificates I the certificate set to find the root certificate, stores in sequence the certificate contents of all certificates started from the root certificate into the response cache, and packages the data in the response cache according to the security level and returns the packaged data to the upper computer, and returns to the Step S1.

Step S5, obtains the public key of the upper computer and the certificate serial number from the executing security operation instruction, obtains the corresponding certificate of the upper computer according to the certificate serial number, uses the public key of the upper computer to verify the certificate of the upper computer, stores the upper computer key if the certificate of the upper computer is verified successfully, returns the successful response to the upper computer, and returns to Step S1; otherwise, returns the error response to the upper computer.

Preferably, in Embodiment 2, Step S5 includes:

Step S5-0, parses the data field content of the executing security operation instruction according to the current security level to obtain a parsed result and stores the parsed result into the receiving cache, and obtains the key version number and the key ID from the receiving cache:

Step S5-1, searches for the corresponding key set from the key storage area according to the key ID and the key version number, executes Step S5-3 if the corresponding key set is found; executes Step S5-2 if the corresponding key set is not found;

Step S5-2, obtains a preset default key set from the key storage area, and executes Step S5-3; and Step S5-3, determines whether there exists legitimate upper computer temporary public key cache according to the obtained key set, if yes, executes Step S5-4; otherwise, returns the error response to the upper computer.

In Embodiment 2, Step S5-3 includes:

Step A1, obtains a corresponding upper computer root public key and a key parameter reference value from the obtained key set according to the key ID;

Step A2, determines whether there exists the upper computer temporary public key cache, if yes, executes Step A3; otherwise, executes Step A4:

Step A3, determines whether both the type of the upper computer temporary public key cache and the key length match with the key parameter reference value obtained from the key set, if yes, executes Step A5; otherwise, executes Step A4:

Step A4, builds an upper computer temporary public key cache according to a preset curve parameter reference value, and sets the type of the upper computer temporary public key cache and the key length according to the key parameter reference value of the obtained key set, and executes Step A5;

Step A5, determines whether the upper computer temporary public key is initialed, if yes, executes Step A6; otherwise, executes Step A7; and Step A6, determines whether the key version number and the key ID are values in the previous instruction, if yes, executes Step A7; otherwise, returns the error response to the upper computer.

In the case that the determination result is no in Step S5-5, the Step S5-5 further includes that the obtained key version number and the key ID are stored.

Thus, Step A6 includes:

Step A6-1, determines whether the key version number and the key ID are stored, if yes, executes Step A6-2; otherwise, executes Step A7; and Step A6-2, determines whether the obtained key version number and the key ID are same as the stored key version number and the key ID, if yes, executes Step A7; otherwise, returns the error response to the upper computer.

Step A7 initials the upper computer temporary public key, and executes Step S5-4.

Step S5-4, stores the upper computer root public key from the receiving cache into the upper computer temporary public key cache.

Step S5-5, stores part of the current certificate of the receiving cache, determines whether the current certificate is received completely, if yes, executes Step S5-6; otherwise, returns a response state code to the upper computer, and returns to Step S1.

Step S5-6, uses the public key in the upper computer temporary public key cache to verify the stored current certificate, executes Step S5-7 if the current certificate is verified successfully; returns the error report to the upper computer if the current certificate is verified unsuccessfully.

Preferably, in Embodiment 2, Step S5-6 includes:

Step B1, obtains a certificate serial number from the receiving cache:

Step B2, determines whether the certificate corresponding to the certificate serial number is set, if yes, executes Step B3; otherwise, executes Step B5;

Step B3, determines whether a white list of an appointed key is existed, if yes, executes Step B4; otherwise, executes Step B5;

Step B4, checks whether the certificate serial number of the current certificate is in the white list, if yes, executes Step B5; otherwise, returns an error response to the upper computer; and Step B5, uses the public key of the upper computer temporary public key cache to verify the current certificate, executes Step S5-7 if the current certificate is verified successfully; returns the error report to the upper computer.

Step S5-7, obtains the public key of the upper computer itself from the current certificate.

Step S5-8, determines whether there exists certificate which is not received, if yes, executes Step S5-9; otherwise, uses the public key of the upper computer itself to replace the public key in the upper computer temporary public key cache, returns the response state code to the upper computer, and returns to Step S1.

Preferably, between Step S5-7 and Step S5-8, the method further includes that extracting the key parameter reference value from the current certificate, determining whether the key parameter reference value obtained from the key set is same as the key parameter reference value extracted from the current certificate, if yes, executes Step S5-8; otherwise, returns an error response to the upper computer.

Step S5-9, determines whether there exists a legitimate upper computer public key cache, if yes, executes Step S5-10; otherwise, builds the legitimate upper computer public key cache, and executes Step S5-10, In Embodiment 2, Step S5-9 includes Step C1, determines whether there exists the upper computer public key cache, if yes, executes Step C2; otherwise, executes Step C3;

Step C2, determines whether the type of the upper computer public key cache and the key length match with the key parameter reference value, if yes, executes Step S5-10; otherwise, executes Step C3; and Step C3, builds the upper computer public key cache according to a curve parameter reference value, and sets a curve parameter according to the key parameter reference value stored in the key set, and executes Step S5-10.

Step S5-10, stores the obtained public key of the upper computer itself into the upper computer public key cache, returns the response state code to the upper computer, and returns to Step S1.

Step S6, obtains the public key of the upper computer itself according to the key version number and the key ID in the verifying instruction, generates a receipt according to the upper computer temporary public key, the public key of the upper computer itself and the generated session key in the verifying instruction, and sends the receipt to the upper computer, then returns to Step S1.

In the case that the type of the instruction is determined as an inner verifying instruction in Step S1, Step S6 includes Step S6-11, parses the data field content of the inner verifying instruction according to the current security level to obtain a parsed result, and stores the parsed result into the receiving cache, obtains the key version number and the key ID from the receiving cache;

Step S6-12, obtains a control applet template and an upper computer temporary public key which are consulted by the key from the receiving cache;

Step S6-13, determines a type of security channel protocol option, executes Step S6-14 if the type is a first type; executes Step S6-17 if the type is a second type;

Step S6-14, generates the device temporary key pair, searches for the public key of the upper computer itself according to the key version number and the key ID; and Step S6-15, generates the receipt according to the public key of the upper computer itself, the private key of the device itself, the temporary public key of the upper computer, the control applet template, and the device temporary public key.

Specifically, Step S6-15 includes

Step D1, uses the public key of the upper computer itself to consult with the private key of the device itself to generate a first shared private key, and uses the upper computer temporary public key to consult with the generated device temporary private key to generate a second shared private key;

Step D2, uses a derive algorithm to generate shared information according to the first shared private key and the second shared private key;

Step D3, uses the preset algorithm to generate the session key according to the first shared private key, the second shared private key and the shared information; and Step D4, generates receipt enter data according to a key consultation reference control template, the upper computer temporary public key and the device temporary public key, and generates the receipt according to the receipt enter data and the session key.

Step S6-16, generates response data according to the receipt and the device temporary public key, packages the response data according to the current security level and returns the packaged data to the upper computer, and returns to Step S1.

Step S6-17, searches for the public key of the upper computer itself according to the key version number and the key ID.

Step S6-18, generates the receipt according to the public key of the upper computer itself, the private key of the device itself, the upper computer temporary public key, the control applet template, and the public key of the device itself.

Specifically, Step S6-18 includes

Step E1, uses the public key of the upper computer itself to consult with the private key of the device itself to generate the first shared private key, and uses the upper computer temporary public key to consult with the private key of the device itself to generate the second shared private key;

Step E2, uses the derive algorithm to generate the shared information according to the first shared private key and the second shared private key;

Step E3, uses the preset algorithm to generate the session key according to the first shared private key, the second shared private key and the shared information; and Step E4, generates the receipt enter data according to the key consultation reference control template, the upper computer temporary public key and the public key of device itself, and generates the receipt according to the receipt enter data and the session key.

Step S6-19, generates the response data according to the receipt and the public key of the device itself, and packages the response data according to the current security level and returns the packaged data to the upper computer, returns to Step S1.

In the case that the type of the instruction is determined as the mutual verifying instruction in Step S1, Step S6 includes Step S6-21, parses the data field content of the instruction according to the current security level and stores the parsed result into the receiving cache, obtains the key version number and the key ID from the receiving cache;

Step S6-22, obtains the control applet template consulted by the key and the upper computer temporary public key from the receiving cache; and Step S6-23, searches for the public key of the upper computer itself according to the key version number and the key ID; generates the device temporary key pair, and generates the receipt according to the public key of the upper computer itself, the private key of the device itself, the upper computer temporary public key, the control applet template, and the device temporary public key.

Specifically, in Embodiment 2, generating the receipt according to the public key of the upper computer itself, the private key of the device itself, the upper computer temporary public key, the control applet template and the device temporary public key includes Step F1, uses the upper computer temporary public key to consult with the private key of the device itself to generate the first shared private key, uses the upper computer temporary public key to consult with the generated device temporary private key to generate the second shared private key;

Step F2, uses the derive algorithm to generate shared information according to the first shared private key and the second shared private key;

Step F3, uses the preset algorithm to generate the session key according to the first shared private key, the second shared private key and the shared information; and Step F4, generate the receipt enter data according to the key consultation reference control template, the upper computer temporary public key and the device temporary public key, and generates the receipt according to the receipt enter data and the session key.

Step S6-24, generates the response data according to the receipt and the device temporary public key, and packages the response data according to the current security level, and returns the packaged data to the upper computer, and returns to Step S1.

In Embodiment 2, the upper computer verifies the received receipt, if the received receipt is verified successfully, uses the session key in the receipt to encrypt the applet data to obtain applet data ciphertext, generates an applet update instruction according to the applet data ciphertext and sends the applet update instruction to the hardware wallet.

Step S7, uses the session key to decrypt the applet data cipher in the applet update instruction, and uses the applet data obtained from the encryption to update the stored applet data, and returns the update successful information to the upper computer, and returns to Step S1.

In Embodiment 2, the method can further include personalized setting process, which includes the following steps:

Step H1, when the hardware wallet receives a personalized instruction from the upper computer, stores the data field content of the personalized instruction into the receiving cache, determines whether the current instruction is the last instruction of the current instructions, if yes, returns the response state code to the upper computer, and waits for receiving data, and returns to Step H1; otherwise, executes Step H2;

Step H2, determines a format of the current instruction, executes Step H3 in the case that the current instruction is a TLV format; otherwise, executes Step H9;

Step H3, determines whether the data in the receiving cache has been processed, if yes, returns the response state code to the upper computer, waits for receiving data, and returns to Step H1; otherwise, executes Step H4;

Step H4, determines the type of the current instruction, executes Step H5 in the case that the current instruction is the setting key information instruction; executes Step H6 in the case that the current instruction is the setting ECC curve parameter instruction; executes Step H7 in the case that the current instruction is the setting ECC key pair instruction; and executes Step H8 in the case that the current instruction is the setting personalized data instruction; and Step H5, obtains the key information from the receiving cache and stores the key information, and returns to Step H3.

Preferably, in Embodiment 2, Step H5-1, determines a type of the setting key information, executes Step H5-2 if the setting key information is a key type; executes Step H5-3 if the setting key information is the key byte length; executes Step H5-5 if the setting key information is the key 1D; executes Step H5-6 if the setting key information is the key parameter reference value; executes Step H5-7 if the setting key information is the key obtaining way; executes Step H5-8 if setting key information is a key access permission; and executes Step H5-9 if the setting key information is a key version number.

Step H5-2, obtains the key type from the receiving cache, and determines whether the key type is the preset type, if yes, builds a key information object, and returns to Step H3; otherwise, wait for receiving data, and returns to Step S1.

Step H5-3, obtains the key length and the key type from the receiving cache, and determines whether the key type is the preset type, if yes, distributes storage space as key storage area according to the key length, and returns to Step H3; otherwise, executes Step H5-4.

Step H5-4, distributes the storage space as a curve parameter storage area according to the key length, and returns to Step H3.

Step H5-5, obtains the key ID from the receiving cache and stores the key ID into a key object, and returns to Step H3.

Step H5-6, obtains the key parameter reference value from the receiving cache, builds a curve parameter set according to the parameter reference value, and returns to Step H3.

Step H5-7, obtains a key usage mode from the receiving cache, and stores the key usage mode into the key object, and returns to Step H3.

Step H5-8, obtains the key access permission from the receiving cache and stores the key accession permission into the key object, and returns to Step H3.

Step H5-9, obtains the key version number from the receiving cache, searches for a corresponding key set from the key sets collection according to the key version number.

Step H5-10, determines whether the obtained key set is empty, if yes, executes Step H5-11; otherwise, executes Step H5-15.

Step H5-11, obtains a default key set from the receiving cache.

Step H5-12, determines whether a version number of the obtained key set is a first preset version number, if yes, executes Step H5-13; otherwise, executes Step H5-14.

Step H5-13, updates the version number of the key set as the key version number, and executes Step H5-15.

Step H5-14, builds a new key set and adds the new key set into the key sets collection, and executes Step H5-15.

Step H5-15, sets the key usage mode and the key access permission in the key information object.

Step H5-16, sets the key information object into the key set corresponding to the key ID, and returns to Step H3.

Step H6, obtains the curve parameter value from the receiving cache and stores the curve parameter value into the curve parameter set, and returns to Step H3.

Step H7, builds an ECC key object according to the parameter reference value and the curve parameter value in the setting ECC key pair instruction, reads key value from the receiving cache and sets the key value into the ECC key object; stores the ECC key object into the key information object, and returns to Step H3.

Step H8, obtains a security field provider identification number and a security field serial number from the receiving cache and stores the security field provider identification number and the security field serial number, and returns to Step H3.

Step H9, determines whether the data in the receiving cache has been processed, if yes, returns the response state code to the upper computer, waits for receiving data, and returns to Step H1; otherwise, executes Step H10.

Step H10, determines a type of the operation according to the current instruction, executes Step H11 if the operation is storing white list; executes Step H12 if the operation is amending white list; executes Step H13 if the operation is storing upper computer root certificate; executes Step H16 if the operation is setting device certificate.

Step H11, determines whether there exists a legitimate white list, if yes, stores the white list in the receiving cache into the white list, and returns to Step H9; otherwise, returns the error response to the upper computer.

Preferably, in Embodiment 2. Step H11 includes

Step H11-1, determines whether the current security channel protocol option is a preset protocol type, if yes, executes Step H11-2; otherwise, returns the error response to the upper computer;

Step H11-2, determines whether there exists a white list counter value in the receiving cache, if yes, executes Step H11-3; otherwise, returns the error response;

Step H11-3, obtains the white list counter value from the receiving cache;

Step H11-4, determines whether the obtained white list counter value is more than the number of record white list, if yes, executes Step H11-5; otherwise, returns the error response to the upper computer; and Step H11-5, determines whether there exists a white list which is can be used, if yes, obtains white list data from the receiving cache and stores the white list data into the white list, and returns to Step H3; otherwise, returns the error response to the upper computer.

Step H12, determines whether there exists the white list data in the receiving cache, if yes, deletes the white list and stores the public key, and returns to Step H9; otherwise, distributes the storage space according to the white list data length, stores the certificate serial number in the receiving cache into the white list of the storage space, deletes the stored public key, and returns to Step H9.

Preferably, in Embodiment 2, Step H12 includes

Step H12-1, determines whether there exists white list data in the receiving cache, if yes, executes Step H12-3; otherwise, executes Step H12-2;

Step H12-2, deletes the stored white list, and executes Step H12-5;

Step H12-3, distributes storage space according to the white list data;

Step H12-4, obtains the certificate serial number from the receiving cache, and stores the certificate serial number into the white list of the storage space;

Step H12-5, deletes the stored public key; and

Step H12-6, updates the number of the recorded white list by using the white list counter value in the receiving cache, and returns to Step H3.

Step H13, determines whether the root certificate of the upper computer in the receiving cache conform with a preset request, if yes, executes Step H14; otherwise, returns the error response to the upper computer.

Step H14, determines whether all of the current instructions are processed, if yes, returns to Step H3; otherwise, executes Step H15.

Step H15, obtains an issuer identification of the root certificate of the upper computer and the length of the upper computer root certificate issuer identification, and returns to Step H14.

Preferably, in Embodiment 2. Step H15 includes

Step H15-1, determines whether a type of the continued operation, executes Step H15-2 if the continued operation is an obtaining the length of the upper computer root certificate issuer identification; executes Step H15-4 if the continued operation is an obtaining the upper computer root certificate issuer identification;

Step H15-2, obtains the length of the upper computer root certificate issuer identification from the receiving cache, and determines whether the length of the upper computer root certificate issuer identification is in the preset scope, if yes, executes Step H15-3; otherwise, returns the error response to the upper computer;

Step H15-3, stores the length of the upper computer root certificate issuer identification, and returns to Step H14:

Step H15-4, obtains the key information length value from the receiving cache, and determines whether the key information length value conforms to the request, if yes, executes Step H15-5; otherwise, returns the error response to the upper computer;

Step H15-5, obtains the key ID and the key version number from the receiving cache and stores the key ID and the key version number;

Step H15-6, determines whether the key version number is in the preset duration, if yes, executes Step H15-7; otherwise, returns the error response to the upper computer;

Step H15-7, searches for a corresponding key set from the preset key sets according to the key version number, executes Step H15-9 if the corresponding key set is found; executes Step H15-8 if the corresponding key set is not found;

Step H15-8, obtains the default key set from the key cluster, and executes Step H15-9;

Step H15-9, searches for the key information from the key set according to the key ID, executes Step H15-10 if the key information is found; returns the error response to the upper computer if the key information is not found;

Step H15-10, determines whether all the current instructions are processed, if yes, executes Step H9; otherwise, returns to Step H15-11; and Step H15-11, obtains the upper computer root certificate issuer identification from the receiving cache according to the length of the upper computer root certificate issuer identification and stores the upper computer root certificate issuer identification correspondingly with the key information, and returns to Step H14.

Step H16, determines whether the current instruction is a certificate link instruction, if yes, executes Step H17; otherwise, returns the error response to the upper computer.

Step H17, determines whether there exists a legitimate certificate link, if yes, executes Step H18; otherwise, builds a certificate link, and executes Step H18.

In Embodiment 2, Step H17 includes

Step H17-1, determines whether both the stored key ID and the key version number are legitimate, if yes, executes Step H17-2; otherwise, returns the error response to the upper computer;

Step H17-2, searches for the corresponding certificate link from the certificate storage area according to the key ID and the key version number, executes Step H18 if the corresponding certificate link is found; otherwise, executes Step H17-3; and Step H17-3, builds a new certificate link according to the stored key ID and the key version number, and executes Step H18.

Step H18, determines whether it needs to build a temporary certificate, if yes, executes Step H19; otherwise, returns to Step H9.

In Embodiment 2, Step H19 includes

Step H19-1, obtains the temporary certificate data from the receiving cache and builds a temporary certificate according to the read temporary certificate data;

Step H19-2, obtains the current certificate from the certificate link and determines whether the current certificate is obtained successfully, if yes, executes Step H19-4; otherwise, executes Step H19-3;

Step H19-3, check whether a key usage way of the temporary certificate is a signature usage, if yes, executes Step H19-5; otherwise, returns the error response to the upper computer;

Step H19-4, uses the public key of the current certificate to authenticate the temporary certificate, executes Step H19-5 if the temporary certificate is authenticated successfully; otherwise, returns the error response to the upper computer; and Step H19-5, adds the temporary certificate, the key ID and the key version number into the certificate link.

Step H19, builds the temporary certificate, and uses the public key of the current certificate in the certificate link to authenticate the temporary certificate, adds the temporary certificate into the certificate link and executes Step H20 if the temporary certificate is authenticated successfully; otherwise, returns the error response to the upper computer.

Step H20, check whether the key commercial way of the temporary certificate is the key consultation usage, if yes, sets personalization finish mark, and returns to Step H18; otherwise, returns to Step H18.

Specifically, in Embodiment 2, setting personalization finish mark includes setting personalization finish mark according to the key ID, and amending a default value of SCP field in the card data as the personalization finish mark.

In Embodiment 2, packaging all the data in the cache according to the security level specifically includes Step T1, determines the current security level, executes Step T2 if the current security level is a plaintext level; executes Step T3 if the current security level is a ciphertext level;

Step T2, calculates a mac value according to the data in the response cache, compose the data in the response data with the mac value to obtain response data; and Step T3, calculates the mac value according to the data in the cache, encrypts all of the data in the cache to obtain an encrypted result, and composes the encrypted result with the mac value to obtain the response data.

Embodiment 3

According to Embodiment 3 of the present disclosure, there is provided a process of setting personalization before building a security channel for updating a digital currency hardware wallet applet, as shown in FIGS. 3 to 6, includes the following steps.

Step 201, the hardware wallet parses a data field content in a current instruction according to a current security level to obtain a parsed result when receiving an instruction from the upper computer, and stores the parsed result into the receiving cache, Step 202, determines whether the current instruction is a last instruction of a current operation according to data on the third byte of the instruction, if yes, executes Step 204; otherwise, executes Step 203.

Specifically, in Embodiment 3, Step 202 includes that it determines whether a highest order of the data on the third byte of the current instruction is 1, if yes, the current instruction is the last one; otherwise, the current instruction is not the last instruction; for instance, do "and" operation on the data on the third byte of the current instruction and 0x80, the current instruction is not the last instruction if the result is not 0; otherwise, the current instruction is the last instruction.

Step 203, returns a response state code to the upper computer, and waits for receiving data, and returns to Step 201.

Step 204, determines a format of the current instruction, executes Step 205 if the current instruction is TLV format; executes Step 227 if the current instruction is DGI format.

Specifically, in Embodiment 3, Step 204 includes it does "and" operation on the data on the third byte of the current instruction and 0x18, executes Step 205 if the result is 0x08; executes Step 227 if the result is 0x10.

Step 205, determines whether all of the data in the receiving cache is processed, if yes, executes Step 206; otherwise, executes Step 207.

Step 206, returns the response state code to the upper computer, and waits for receiving data, and returns to Step 101.

Step 207, determines a type of the current instruction, executes Step 208 if the current instruction is a setting key information instruction; executes Step 224 if the current instruction is a setting ECC curve parameter instruction; executes Step 225 if the current instruction is a setting ECC key pair instruction; and executes Step 226 if the current instruction is a setting personalization data instruction.

Specifically, in Embodiment 3, Step 207 includes that it obtains data of two bytes from a first preset position of the receiving cache and determines the data, executes Step 208 if the data is 0x00B9; executes Step 224 if the data is 0x0030 or 0x0031 or 0x0032 or 0x0033 or 0x0034 or 0x0035; executes Step 225 if the data is 0x0036 or 0x0037; and executes Step 226 if the data is 0x0070; preferably, the preset position is a fifth byte.

Step 208, determines a feature of setting key information, executes Step 209 if the key information is a key type; executes Step 210 if the key information is a key byte length; executes Step 212 if the key information is a key ID; executes Step 213 if the key information is a key parameter reference value; executes Step 214 if the key information is a key obtaining way; executes Step 215 if the key information is a key access permission; and executes Step 216 if the key information is a key version number.

Specifically, in Embodiment 3, Step 208 includes that it obtains data of one byte from the second preset position of the receiving cache and determines the data, executes Step 209 if the data is 0x80; executes Step 210 if the data is 0x81; executes Step 212 if the data is 0x82; executes Step 213 if the data is 0x85; executes Step 214 if the data is 0x95; executes Step 215 if the data is 0x96; and executes Step 216 if the data is 0x83.

Step 209, obtains a type of the key from the receiving cache, determines whether the type of the key is a preset type, if yes, builds a key information object, and returns to Step 205; otherwise, waits for receiving data, and returns to Step 201.

For example, the preset type in Embodiment 3 is an ECC public key or a private key. Step 209 specifically is that obtains the data on a third preset position from the receiving cache, and determines the data, the key is the preset type if the data on the third preset position is 0xB0 or 0xB1; otherwise, the key is not the preset type.

Step 210, obtains the key length and the key type from the receiving cache, determines whether the type of the key is the preset type, if yes, allocates a storage space as a key storage area according to the key length, and returns to Step 205; otherwise, executes Step 211.

Step 211, allocates the storage space as a curve parameter storage area according to the key length, and returns to Step 205.

Step 212, obtains the key ID from the receiving cache and stores the key ID into the key object, and returns to Step 205.

Step 213, obtains a key parameter reference value from the receiving cache, and builds a curve parameter collection according to the parameter reference value, and returns to Step 205.

Step 214, obtains the key usage way from the receiving cache and stores the key usage way into the key object, and returns to Step 205.

Step 215, obtains the key access permission from the receiving cache and stores the key access permission into the key object, and returns to Step 205.

Step 216, obtains the key version number from the receiving cache, and searches for a corresponding key set from the key cluster according to the key version number.

Step 217, determines whether the found key set is empty, if yes, executes Step 218; otherwise, executes Step 222.

Step 218, obtains a default key set from the receiving cache.

Step 219, determines whether the version number of the obtained key set is a preset version number, if yes, executes Step 220; otherwise, executes Step 221.

Step 220, updates the version number of the key set with the key version number, and executes Step 222.

Step 221, builds a new key set and adds the new key set into the key cluster, and executes Step 222.

Step 222, sets the key usage way and the key access permission in the key information object.

Step 223, sets the key information object into the key set corresponding to the key ID, and returns to Step 205.

Step 224, obtains a value of the curve parameter from the receiving cache, stores the value of the curve parameter into the curve parameter collection, and returns to Step 205.

In Embodiment 3, the ECC curve parameter includes ECC curve parameter A, ECC curve parameter B, ECC curve parameter G, ECC curve parameter N, and ECC curve parameter K.

Step 225, builds the ECC key object according to the parameter reference value and the curve parameter value, reads a key value from the receiving cache and sets the key value into the ECC key object; and stores the ECC key object into the key information object, and returns to Step 205.

In Embodiment 3, the ECC key pair includes an ECC public key and an ECC private key.

Step 226, obtains a security field provider identification number and a security field serial number from the receiving cache and stores the security field provider identification number and the security field serial number, and returns to Step 205.

In Embodiment 3, the security field provider identification number and the security field serial number may be sent for two times or at one time.

Step 227, determines whether all of the data in the receiving cache is processed, if yes, executes Step 228; otherwise, executes Step 229.

Step 228, returns the response state code to the upper computer, and wait for receiving data, and returns to Step 201.

Step 229, determines the type of the operation according to the current instruction, executes Step 230 if the operation is storing white list; executes Step 235 if the operation is amending white list; executes Step 241 if the operation is storing upper computer root certificate; executes Step 254 if the operation is setting device certificate.

Specifically, in Embodiment 3, Step 229 includes obtaining data of one byte from a fourth preset position of the receiving cache and determines the data, in which the type of the operation is a storing white list if the data is 0x92, and Step 230 is executed; the type of the operation is an amending white list if the data is 0x70, and Step 235 is executed; the type of operation is a storing upper computer root certificate if the data is 0xA6, and Step 241 is executed; the type of operation is a setting device certificate if the data is 0xBF, and Step 254 is executed.

Step 230, determines whether a current security channel protocol option is a preset protocol type, if yes, executes Step 231; otherwise, returns the error response to the upper computer.

In Embodiment 3, the preset protocol type is SCP11c.

Step 231, determines whether there exists a white list counter value in the receiving cache, if yes, executes Step 232; otherwise, returns the error response to the upper computer.

Step 232, obtains the white list counter value from the receiving cache.

Preferably, in Embodiment 3, the white list counter value is data of two bytes.

Step 233, determines whether the obtained white list counter value is more than a number of recorded white list, if yes, executes Step 234; otherwise, returns the error response to the upper computer.

Step 234, determines whether there exists white list which can be used, if yes, obtains white list data from the receiving cache and stores the white list data into the white list, and returns to Step 227; otherwise, returns the error response to the upper computer.

Specifically, in Embodiment 3, Step 234 includes that it determines whether the number of the white list reaches 32767, if yes, there is no white list which can be used, returns the error response to the upper computer; otherwise, obtains the corresponding white list data from the receiving cache and stores the white list data into the white list, returns to Step 227.

Step 235, determines whether there exists white list data in the receiving cache, if yes, executes Step 237; otherwise, executes Step 236.

Step 236, deletes the stored white list, and executes Step 239.

Step 237, allocates the storage space according to a length of the white list data.

In Embodiment 3, the storage space which is allocated is used to store the white list data, the initial value of the number of white lists is 0.

Step 238, obtains the certificate serial number from the receiving cache and stores the certificate serial number into the white list of the storage space.

Step 239, deletes the stored public key.

Step 240, updates the number of the record white list with the white list counter value in the receiving cache, and returns to Step 227.

Step 241, obtains the upper computer root certificate from the receiving cache, and determines the upper computer root certificate conforms to the preset request, if yes, executes Step 242, otherwise, returns the error response to the upper computer; The preset request in Embodiment 3 is that the length of the root certificate is 4, or 7<the length of the root certificate <22.

Step 242, determines whether all of the current instructions are processed, if yes, returns to Step 227; otherwise, executes Step 243.

Step 243, determines a type of a continued operation, executes Step 244 if the continued operation is obtaining length of upper computer root certificate issuer identification; executes Step 246 if the continued operation is obtaining upper computer root issuer identification.

Specifically, in Embodiment 3, obtains data of one byte from the fifth preset position of the receiving cache and determines the data, executes Step 244 if the data is 0x42; executes Step 246 if the data is 0x83.

Step 244, obtains the length of the upper computer root certificate issuer identification from the receiving cache, and determines whether the length of the upper computer root certificate issuer identification is in the preset scope, if yes, executes Step 245; otherwise, returns the error response to the upper computer.

Specifically, in Embodiment 3, the preset scope is from 1 to 16.

Step 245, stores the length of the upper computer root certificate issuer identification, and returns to Step 242.

Step 246, obtains the key information length value from the receiving cache, and determines whether the key information length value conforms to the request, if yes, executes Step 247; otherwise, returns the error response to the upper computer.

Specifically, in Embodiment 3, determining whether the key information length value conforms to the request includes determining whether the key information length value is 2, if yes, the key information length value conforms to the request; otherwise, the key information length value does not conform to the request.

Step 247, obtains the key ID and the key version number from the receiving cache and stores the key ID and the key version number.

Step 248, determines whether the key version number is in the preset duration, if yes, executes Step 249; otherwise, returns the error response to the upper computer.

Specifically, in Embodiment 3, the preset duration is from 0x1 to 0x1F.

Step 249, searches for the corresponding key set from the preset key sets according to the key version number, executes Step 251 if the corresponding key set is found; and executes Step 250 if the key set is not found.

Step 250, obtains a default key set from the preset key cluster, and executes Step 251.

Step 251, searches for the key information from the key set according to the key ID, executes Step 252 if the key information is found; returns to the error response to the upper computer if the key information is not found.

Step 252, determines whether all of the current instructions are processed, if yes, executes Step 227; otherwise, executes Step 253.

Step 253, obtains the upper computer root certificate issuer identification from the receiving cache according to the length of the upper computer root certificate issuer identification and stores the upper computer root certificate issuer identification corresponding with the key information, and returns to Step 242.

Step 254, determines whether the received instruction is a certificate link instruction, if yes, executes Step 255; otherwise, returns the error response to the upper computer.

Specifically, in Embodiment 3, determines whether the data on the sixth preset position of the receiving cache is 0x21, if yes, executes Step 255; otherwise, returns the error response to the upper computer.

Step 255, determines whether the stored key ID and the key version number are legitimate, if yes, executes Step 256; otherwise, returns the error response to the upper computer.

Specifically, in Embodiment 3, Step 255 includes that it determines whether the stored key ID is −1 or the key version number is −1, if yes, the stored key ID and the key version number are illegitimate; otherwise, the stored key ID and the key version number are legitimate.

Step 256, searches for a corresponding certificate link from the certificate storage area according to the key ID and the key version number, if yes, executes Step 258 if the corresponding certificate link is found, otherwise, executes Step 257.

Step 257, builds a new certificate link according to the stored key ID and the key version number, and executes Step 258.

Step 258, determines whether it needs to build a temporary certificate, if yes, executes Step 259; otherwise, returns to Step 277.

In Embodiment 3, Step 258 specifically is that reads data of two byte from the seventh preset position of the receiving cache, and determines whether the data is 7F21, if yes, executes Step 259; otherwise, returns to Step 227.

Step 259, obtains the temporary certificate data from the receiving cache, and builds a temporary, certificate according to the read temporary certificate data.

Step 260, obtains the current certificate from the certificate link and determines whether the current certificate is obtained successfully, if yes, executes Step 262; otherwise, executes Step 261.

Step 261, check whether the key usage way of the temporary certificate is the signature usage, if yes, executes Step 263; otherwise, returns the error response to the upper computer.

Step 262, uses a public key of the current certificate to authenticate the temporary certificate, executes Step 263 if the temporary certificate is authenticated successfully; returns the error response to the upper computer if the temporary certificate is authenticated unsuccessfully.

Step 263, adds the temporary certificate, the key ID and the key version number to the certificate link.

Step 264, check whether the key usage way of the temporary certificate is the key consultation usage, if yes, executes Step 265; otherwise, returns to Step 258.

Step 265, sets the personalization finish mark according to the key ID.

Step 266, amends the default value of SCP field in the card data as the personalization finish mark, and returns to Step 258.

Embodiment 4

According to Embodiment 4 of the present invention, it provides a method for building a security channel for updating a digital currency hardware wallet applet, as shown in FIGS. 7 to 10, which includes Step 301, determines a type of an instruction when the hardware wallet receives the instruction from the upper computer, executes Step 302 if the instruction is an obtaining data instruction; executes Step 310 if the instruction is an executing security operation instruction; executes Step 334 if the instruction is the authenticating mutually instruction; executes Step 344 if the instruction is an inner authenticating instruction; and executes Step 354 if the instruction is an applet updating instruction.

Specifically, in Embodiment 4, determines the type of the instruction according to data on the second byte of the instruction, the instruction is the obtaining data instruction if the data is a first numerical value; the instruction is the executing security operation instruction if the data is a second numerical value; the instruction is the authenticating mutually instruction if the data is a third numerical value; and the instruction is the inner authenticating instruction if the data is a fourth numerical value.

For instance, in Embodiment 4, the first numerical value is 0xCA, the second numerical value is 0x2A, the third numerical value is 0x82, the fourth numerical value is 0x88.

Step 302, determines whether a type of the data which is being obtained when the obtaining data instruction is received, executes Step 303 if the data to be obtained is key information; and executes Step 307 if the data to be obtained is device certificate information.

In Embodiment 4, Step 302 specifically is for determining data on the third byte and the fourth byte of the instruction, the type of data to be obtained is the key information if the data is the first data, and executes Step 303; while the type of data to be obtained is a device certificate information if the data is the second data, and executes Step 307.

For example, in Embodiment 4, the first data is 0083, the second data is BF21, the key information may include the key ID or the key version number.

Step 303, parses data field content of the obtaining data instruction according to a current security level to obtain a parsed result, and stores the parsed result into the receiving cache.

Specifically, in Embodiment 4, Step 303 includes that it determines the data field content according to the current security level, parses the data field content of the obtaining data instruction to obtain a MAC value and plaintext data if the data field content of the instruction is the plaintext data with MAC, authenticates the MAC value, stores the plaintext data into the receiving cache if the MAC value is authenticated successfully; returns the error response to the upper computer if the MAC value is authenticated unsuccessfully; parses the data field content of the obtaining data instruction to obtain the MAC value and the first encrypted data if the data field content is the ciphertext data with MAC, authenticates the MAC value, decrypts the first encrypted data to obtain the plaintext data and stores the plaintext data into the receiving cache if the MAC is authenticated successfully; and returns the error response to the upper computer if the MAC is authenticated unsuccessfully.

Step 304, determines whether the data in the receiving cache is legitimate, if yes, executes Step 305; otherwise, returns the error response to the upper computer.

Preferably, in Embodiment 4, Step 304 includes that it checks whether data on the first preset position of the receiving cache conforms the request, if yes, the data in the receiving cache is legitimate; otherwise, the data in the receiving cache is illegitimate.

Step 305, obtains the key set identification from the receiving cache, searches for a corresponding key set from the key storage area according to the key set identification, executes Step 306 if the corresponding key set is found; returns the error response to the upper computer if the corresponding key set is not found.

Step 306, obtains the key version and the key identification from the key set, and stores the key version and the key identification into the response cache, and packages the data in the response cache according to the security level and returns the packaged data to the upper computer, and returns to Step 301.

Step 307, parses the data field content of the obtaining data instruction according to the current security level to obtain a parsed result, and stores the parsed result into the receiving cache, and determines whether the data in the receiving cache is legitimate, if yes, executes Step 308; otherwise, returns the error response to the upper computer.

Preferably, in Embodiment 4, Step 307 includes that it determines whether the data on the second preset position of the receiving cache conforms to the request, if yes, the data in the receiving cache is legitimate; otherwise, the data in the receiving cache is illegitimate.

Step 308, obtains the certificate set identification from the receiving cache, and searches for a corresponding certificate set from the certificate storage area according to the certificated set identification, executes Step 309 if the corresponding certificate set is found; returns the error response to the upper computer if the corresponding certificate set is not found.

Step 309, traverses superior certificates in the certificate set to find the root certificate, stores the certificate content of all of the certificates started from the root certificate into the response cache, packages the data in the response cache according to the current security level and returns the packaged data to the upper computer, and returns to Step 301.

Step 310, parses the data field content of the executing security operation instruction according to the current security level to obtain a parsed result, stores the parsed result into the receiving cache, and obtains the key version number and the key ID from the receiving cache.

Step 311, obtains the corresponding key set from the key storage area according to the key version number and the key ID, executes Step 313 if the corresponding key set is obtained; executes Step 312 if the corresponding key set is obtained.

Step 312, obtains a preset default key set from the key storage area, and executes Step 313.

Step 313, obtains a corresponding upper computer root public key and key parameter reference value from the obtained key set.

Step 314, determines whether there exists an upper computer temporary public key cache, if yes, executes Step 315; otherwise, executes Step 316.

Step 315, determines whether a type of the upper computer temporary public key cache and the key length matches with the key parameter reference value obtained from the key set, if yes, executes Step 317; otherwise, executes Step 316.

Step 316, builds the upper computer temporary public key cache according to the preset curve parameter reference value, and sets the type of the upper computer temporary public key cache and the key length according to the obtained key parameter reference value in the key set, and executes Step 317.

Step 317, determines whether the upper computer temporary public key is initialized, if yes, executes Step 318; otherwise, executes Step 319.

Step 318, determines whether the key version number and the key ID are the value in the previous record, if yes, executes Step 319; otherwise, returns the error response to the upper computer.

Preferably, in Embodiment 4, Step 318 includes

Step 318-1, determines whether the key version number and the key ID are stored, if yes, executes Step 318-2; otherwise, executes Step 319; and Step 318-2, determines whether the key version number and the key ID which are obtained are same as the key version number and the key ID which are stored, if yes, executes Step 319; otherwise, returns the error response to the upper computer.

Step 319, stores the key information of the obtained upper computer root public key into the upper computer temporary public key cache, and initializes the upper computer temporary public key, and executes Step 320.

Step 320, determines whether all of the data in the receiving cache is processed, if yes, executes Step 321; otherwise, executes Step 322.

Step 321, stores the key version number and the key ID which are obtained, packages the data in the response cache and returns the packaged data to the upper computer, and returns to Step 301.

In Embodiment 4, packaging all the data in the cache specifically includes

Step 321-1, determines the current security level, executes Step 321-2 if the current security level is the plaintext level; executes Step 321-3 if the current security level is the ciphertext level:

Step 321-2, calculates the mac value according to the data in the response cache, composes the data in the response cache and the mac value to obtain response data; and Step 321-3, calculates the mac value according to the data in the cache, encrypts all of the data in the cache to obtain an encrypted result, composes the encrypted result and the mac value to obtain the response data.

Step 322, obtains the certificate serial number from the receiving cache.

Step 323, determines whether a certificate corresponding to the certificate serial number is set, if yes, executes Step 324; otherwise, executes Step 326.

Step 324, determines whether there exists a white list of an appointed key, if yes, executes Step 325; otherwise, executes Step 326.

Step 325, check whether the certificate serial number of the current certificate is in the white list, if yes, executes Step 326; otherwise, returns the error response to the upper computer.

Step 326, uses the public key in the upper computer temporary public key cache to authenticate the current certificate, executes Step 327 if the current certificate is authenticated successfully; returns the error response to the upper computer if the current certificate is authenticated unsuccessfully.

Step 327, extracts the public key of the upper computer itself and the key parameter reference value from the current certificate.

Step 328, determines whether the key parameter reference value obtained from the key set is same as the key parameter reference value extracted from the current certificate, if yes, executes Step 329; otherwise, returns the error response to the upper computer.

Step 329, determines whether there exists any certificate which is not processed, if yes, replaces the public key in the upper computer temporary public key cache with the public key of the upper computer itself, and returns the response state code to the upper computer, and returns to Step 301; otherwise, executes Step 330.

Specifically, the response state code in Step 329 is 9000.

Step 330, determines whether there exists the upper computer public key cache, if yes, executes Step 331; otherwise, executes Step 332.

Step 331, determines whether the type of the upper computer public key cache and the key length match with the key parameter reference value, if yes, executes Step 333; otherwise, executes Step 332.

Step 332, builds the upper computer public key cache according to the curve parameter reference value, and sets the curve parameter according to the key parameter reference value stored in the key set, and executes Step 333.

Step 333, stores the obtained public key of the upper computer itself into the upper computer public key cache, returns the response state code to the upper computer, and returns to Step 301.

Step 334, parses the data field content of the authenticating mutually instruction according to the current security level to obtain a parsed result, and stores the parsed result into the receiving cache, and obtains the key version number and the key ID from the receiving cache.

Step 335, obtains a control applet template consulted by the key and the temporary public key of the upper computer from the receiving cache.

Step 336, determines a type of the security channel protocol option, executes Step 337 if the security channel protocol option is the first type; executes Step 342 if the security channel protocol option is the second type.

Specifically, in Embodiment 4, the first type is the security channel protocol SCP31a; the second type is the security channel protocol SCP31c.

Step 337, generates the device temporary key pair, searches for the public key of the upper computer itself according to the key version number and the key ID, generates a first shared private key by consulting the public key of the upper computer itself with the private key of the device itself, and generates a second shared private key by consulting the temporary public key of the upper computer and the generated device temporary private key.

Step 338, generates shared information by using the derive algorithm according to the first share private key and the second shared private key.

Specifically, in Embodiment 4, the generated shared information includes that a key usage way, a key type, the key length, a length and a value of upper computer ID, a length and a value of security field provider identification number, a value and a length of security field Image serial number;

Step 339, generates the shared information by using the derive algorithm according to the first shared private key and the second shared private key.

Step 340, generates receipt input data according to the key consultation reference control template, the upper computer temporary public key and the device temporary public key, and generates a receipt according to the receipt input data and the session key.

Step 341, generates the response data according to the receipt and the device temporary public key, and packages the response data according to the current security level and returns the packaged response data to the upper computer, and returns to Step 301.

In Embodiment 4, the upper computer parses the response data after receiving the data to obtain the receipt and the device temporary public key, authenticates the receipt by using the device temporary public key, the security channel is built successfully if the receipt is authenticated successfully, and the hardware wallet starts the trade with the upper computer.

Step 342, searches for the public key of the upper computer itself according to the key version number and the key ID, generates the first share private key by using the public key of the upper computer itself to consult with the private key of the device itself, and generates the second shared private key by using the upper computer temporary public key to consult with the private key of the device itself.

Step 343, generates the shared information by using the derive algorithm according to the first shared private key and the second shared private key.

Specifically, in Embodiment 4, the generated shared information includes the key usage way, the key type, the key length, the length and the value of the upper computer ID, a serial number of card group.

Step 344, generates the session key by using the preset algorithm according to the first shared private key, the second shared private key and the shared information.

Step 345, generates the receipt input data according to the key consultation reference control template, the upper computer temporary public key and the public key of the device itself, and generates the receipt according to the receipt input data and the session key.

Step 346, generates the response data according to the receipt and the public key of the device itself, and packages the response data according to the current security level and returns the packaged response data to the upper computer, and returns to Step 301.

In Embodiment 4, the upper computer parses the response data after receiving the response data to obtain the receipt and the public key of the device itself, and uses the device temporary public key to authenticate the receipt, the security channel is built successfully if the receipt is authenticated successfully, and the hardware wallet transacts with the upper computer.

Step 347, parses the data field content of the internal authenticating instruction according to the current security level to obtain a parsed result, stores the parsed result into the receiving cache, and obtains the key version number and the key ID from the receiving cache.

Step 348, obtains the control applet template consulted by the key and the upper computer temporary public key from the receiving cache.

Step 349, generates the device temporary key pair, searches for the public key of the upper computer itself according to the key version number and the key ID, uses the upper computer temporary public key to consult with the private key of the device itself to generates the first shared private key, and uses the upper computer temporary public key to consult with the generated device temporary private key to generate the second shared private key.

Step 350, uses the derive algorithm to generate the shared information according to the first shared private key and the second shared private key.

Specifically, in Embodiment 4, the shared information includes the key usage way, the key type, the key length, the length and the value of the upper computer ID, the length and the value of the security field provider identification number, the length and the value of the security field Image serial number.

Step 351, uses the preset algorithm to generate the session key according to the first shared private key, the second shared private key and the shared information.

Step 352, generates the receipt input data according to the key consultation reference control template, the upper computer temporary public key and the device temporary public key, and generates the receipt according to the receipt input data and the session key.

Step 353, generates the response data according to the receipt and the device temporary public key, and packages the response data according to the current security level and returns the packaged response data to the upper computer, and returns to Step 301.

The upper computer authenticates the response data when receiving the response which includes the receipt, the security channel is built successfully if the response data is authenticated successfully, the upper computer uses the session key to encrypts the applet data to obtain the applet data ciphertext, and sends an applet updating instruction which includes the applet data cipher text to the hardware wallet; the security channel is built unsuccessfully if the response data is authenticated unsuccessfully, and the upper computer displays the error information, and ends the process.

The communication data between the upper computer and the hardware wallet needs to be encrypted by using the session key after the response data is authenticated by the upper computer, in this way, the security of the data can be ensured.

Step 354, uses the session key to decrypts the applet data ciphertext in the applet updating instruction, and uses the obtained applet data from the encryption to update the stored applet data, and returns the updating successful information to the upper computer.

In the present disclosure, private-sensitive information is generated based on an ECC key consultation when the applet is updated; a session key is obtained according to the private-sensitive information; the session key encrypts and transmits data to ensure the security of the data; the session key calculates MAC of data package to ensure the completion of the data; the private key generated in several ways which include: the private key is generated through using static key pair and temporary key pair by the two parties of authentication (ShSss+ShSee); (two-direction authentification) the private key is generated through using static key pair and temporary key pair by the two parties of authentication (ShSes+ShSee); (single-direction+PIN) the private key is generated through using static key pair and temporary key pair by the two parties of authentication (ShSss+ShSes); and (two-direction authentification) various variations, such as generated from a key pair, a complete standard certificate, a self-defined format, or a predefined script, so as to reduce pressure of the server.

Embodiment 5

Figure 11:
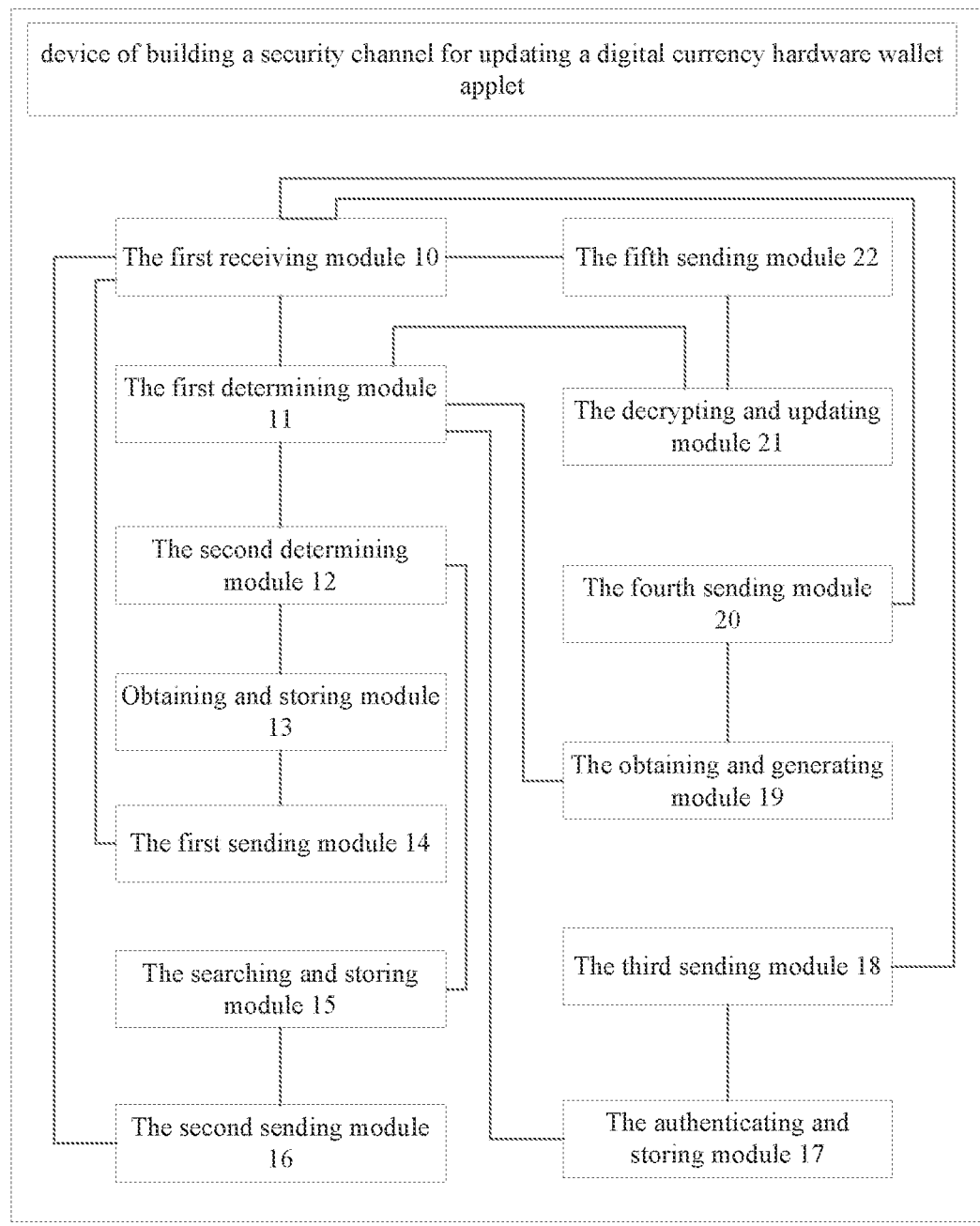
FIG. 11 is a block diagram of a device for building a security channel of updating a digital currency hardware wallet applet according to Embodiment 5.

According to Embodiment 5 of the present invention, it provides a device of building a security channel for updating a digital currency hardware wallet applet. As shown in FIG. 11, it includes a first receiving module 10 which is configured to receive an instruction from the upper computer;

a first determining module 11 which is configured to determine a type of the instruction received by the first receiving module 10, to trigger a second determining module 12 if the instruction is an obtaining data instruction; to trigger an authenticating and storing module 17 if the instruction is an executing security operation instruction; to trigger an obtaining and generating module 19 if the instruction is an authenticating instruction; and to trigger a decrypting and updating module 21 if the instruction is an applet updating instruction;

the second determining module 12 which is configured to determine a type of the data which is being obtained according to the obtaining data instruction, to trigger the obtaining and storing module 13 if the data which is being obtained is an obtaining key information; while to trigger the searching and storing module 15 if the data which is being obtained is an obtaining device certificate information;

the obtaining and the storing module 13 which is configured to obtain a key version and a key identification from a corresponding key set according to a key set identification in the obtaining data instruction and to store the key version and the key identification;

a first sending module 14 which is configured to return the key version and the key identification stored by the obtaining and storing module 13 to the upper computer, and to trigger the first receiving module 10;

the searching and storing module 15 which is configured to search for a corresponding certificate set according to a certificate set identification in the obtaining data instruction, to traverse higher-level certificates in the certificate set to find a root certificate, and to store a certificate content of all the certificates, in sequence, which starts from the root certificate;

a second sending module 16 which is configured to return the content of all the certificates which are stored by the searching and storing module 15 to the upper computer, and to trigger the first receiving module 10:

the authenticating and storing module 17 which is configured to obtain a public key of the upper computer itself and a certificate serial number from the executing security operation, to obtain a corresponding upper computer certificate according to the certificate serial number, and to authenticate the upper computer certificate by using the public key of the upper computer itself, and to store the upper computer key if the upper computer certificate is authenticated successfully;

a third sending module 18 which is configured to return a successful response to the upper computer when the upper computer certificate is authenticated successfully by the authenticating and storing module 17, and to trigger the first receiving module 10; which is further configured to return the error information to the upper computer when the upper computer certificate is authenticated unsuccessfully by the authenticating and storing module 17;

the obtaining and generating module 19 which is configured to obtain the public key of the upper computer itself according to the key version number and the key ID in the authenticating instruction, and to generate a receipt according to the upper computer temporary public key, the public key of the upper computer itself and a generated session key which are in the authenticating instruction;

a fourth sending module 20 which is configured to send the receipt which is generated by the obtaining and generating module 19 to the upper computer, to trigger the first receiving module 10;

the decrypting and updating module 21 which is configured to decrypt the applet data ciphertext in the applet updating instruction by using the session key, and to update the stored applet data with the applet data which is obtained by decrypting the applet data ciphertext successfully; and a fifth sending module 22 which is configured to return updating successful information to the upper computer after the decrypting and updating module 21 updates the stored applet data with the applet data which is obtained by decrypting the applet data cipher text successfully, and to trigger the first receiving module 10.

Preferably, in Embodiment 5, the obtaining and storing module 13 comprises:

a first parsing and storing sub-module which is configured to parse the data field content in the received data instruction according to the current security level to obtain a parsed result, and to store the parsed result into a receiving cache;

a first determining sub-module which is configured to determine whether the data in the receiving cache is legitimate, if yes, to trigger a first obtaining and searching sub-module; otherwise, to trigger the first sending module 14 to send an error response to the upper computer:

the first obtaining and searching sub-module which is configured to obtain a key set identification from the receiving cache, and search for a corresponding key set from the key storage area according to the key set identification, and to trigger a first obtaining and storing sub-module if the key set is found; otherwise, to trigger the first sending module 14 to return error response to the upper computer;

an obtaining and checking sub-module which is configured to obtain a key set identification from the receiving cache, search for a corresponding key set from the key storage area according to the key set identification, to trigger a first obtaining and storing sub-module if the corresponding key set is found; to trigger the first sending module 14 to return the error response to the upper computer if the corresponding key set is not found:

the first obtaining and storing sub-module which is configured to obtain the key version and the key identification from the key set, and to store the key version and the key identification into the response cache:

a packaging sub-module which is configured to package data in the response cache according to the security level; and the first sending module 14 which is specifically configured to return the data packaged by the packaging sub-module to the upper computer, and to trigger the first receiving module 10.

Preferably, in Embodiment 5, the searching and storing module 15 comprises:

a second parsing and storing sub-module which is configured to parse the data field content of the received obtaining data instruction according to the current security level to obtain the parsed result and to store the parsed result into the receiving cache;

a second determining sub-module which is configured to determine whether the data in the receiving cache is legitimate, if yes, to trigger a second obtaining and searching sub-module; otherwise, and to trigger the second sending module 16 to return the error response to the upper computer;

the second obtaining and searching sub-module which is configured to obtain the certificate set identification from the receiving cache, and to search for the corresponding certificate set from the certificate storage area according to the certificate set identification, and to trigger a first storing sub-module if the certificate set is found; otherwise, to trigger the second sending module 16 to return error response to the upper computer;

the first storing sub-module which is configured to traverse all the superior certificates in the certificate set to find the root certificate and to store, in sequence, the certificate content of all the certificates started from the root certificate into the response cache;

the packaging sub-module which is configured to package the data in the response cache according to the security level; and the second sending module 16 which is specifically configured to return the data package packaged by the packaging sub-module to the upper computer, and to trigger the first receiving module.

Preferably, in Embodiment 5, the authenticating and storing module 17 includes:

a third parsing and storing sub-module which is configured to parse the data field content in the executing security operation instruction according to the current security level and to store the parsed result into the receiving cache;

a first obtaining sub-module which is configured to obtain the key version number and the key ID from the receiving cache;

a first searching sub-module which is configured to search for the corresponding key set from the key storage area according to the key ID and the key version number obtained by the first obtaining sub module, to trigger a third determining sub-module if the corresponding key set is found; and to trigger a second obtaining sub-module if the corresponding key set is not found;

the second obtaining sub-module which is configured to obtain a preset default key set from the key storage area, and to trigger a third determining sub-module;

the third determining sub-module which is configured to determine whether there is a legitimate upper computer temporary public key cache according to the obtained key set, if yes, to trigger a first storing sub-module; otherwise, to trigger the third sending module 18 to return the error response to the upper computer;

the first storing sub-module which is configured to store the upper computer root public key in the receiving cache into the upper computer temporary public key cache;

a storing and determining sub-module which is configured to store part of the current certificate in the receiving cache, and determine the current certificate is received completely, if yes, to trigger a first authenticating sub-module; otherwise, to trigger the third sending module 18 to return the response state code to the upper computer, and to trigger the first receiving module;

the first authenticating sub-module which is configured to authenticate the stored current certificate by using the public key in the upper computer temporary public key cache, and to trigger a first extracting sub-module if the stored current certificate is authenticated successfully; and to trigger the third sending module 18 to return the response state code to the upper computer if the stored current certificate is authenticated unsuccessfully;

the first extracting sub-module which is configured to extract the public key of the upper computer itself from the current certificate;

a determining and replacing sub-module which is configured to determine whether there is a certificate which is not received, if yes, to trigger a fourth determining sub-module; otherwise, to replace the public key in the upper computer temporary public key cache with the public key of the upper computer itself, and trigger the third sending module 18 to return the response state code to the upper computer, and to trigger the first receiving module 10:

the fourth determining sub-module which is configured to determine whether there exists the legitimate upper computer public key cache, if yes, to trigger the second storing sub-module; otherwise, to trigger the first building sub-module;

the first building sub-module which is configured to build the legitimate upper computer public key cache, and to trigger the second storing sub-module; and the second storing sub-module which is configured to store the obtained public key of the upper computer itself into the upper computer public key cache, and to trigger the third sending module 18 to return the response state code to the upper computer, and to trigger the first receiving module 10.

Preferably, in Embodiment 5, the third determining sub-module includes:

a first obtaining unit which is configured to obtain a corresponding upper computer root public key and the key parameter reference value from the obtained key set according to the key ID:

a first determining unit which is configured to determine whether there exists an upper computer temporary public key cache, if yes, to trigger a second determining unit; otherwise, to trigger a building and setting unit;

the second determining unit which is configured to determine whether the type of the upper computer temporary public key cache and the key length match with the key parameter reference value obtained from the key set, if yes, to trigger a third determining unit; otherwise, and to trigger a first building and setting unit;

the first building and setting unit which is configured to build the upper computer temporary public key cache according to the preset curve parameter reference value, and to set the type of the upper computer temporary public key cache according to the key parameter reference value in the obtained key set and the key length, and to trigger a third determining unit;

the third determining unit which is configured to determine whether the upper computer temporary public key is initialized, if yes, to trigger a fourth determining unit; otherwise, and to trigger an initializing unit;

a fourth determining unit which is configured to determine whether the key version number and the key ID are the value in the previous instruction, if yes, to trigger an initializing unit; otherwise, to trigger the third sending module to return the error response to the upper computer; and the initializing unit which is configured to initialize the upper computer temporary public key, and to trigger the first storing sub-module.

Preferably, in Embodiment 5, in the case that the current certificate is not received completely, the storing and determining sub-module is configured to store the obtained key version number and the key ID.

A fourth determining unit includes:
- a first determining sub-unit which is configured to determine whether the key version number and the key ID are stored, if yes, to trigger a second determining sub-unit; otherwise, to trigger the initializing unit; and
- the second determining sub-unit which is configured to determine whether the key version number and the key ID which are obtained are same as the key version number and the key ID which are stored, if yes, to trigger the initializing unit; otherwise, to trigger the third sending module 18 to return the error response to the upper computer.

Preferably, in Embodiment 5, the first authenticating sub-module includes:
- a second obtaining unit which is configured to obtain a certificate serial number from the receiving cache:
- a fifth determining unit which is configured to determine whether a certificate corresponding to the certificate serial number is set, if yes, to trigger a sixth determining unit; otherwise, to trigger a first authenticating unit;
- the sixth determining unit which is configured to determine whether the white list of an appointed key exists, if yes, to trigger a first checking unit; otherwise, to trigger the first authenticating unit;
- the first checking unit which is configured to check whether the certificate serial number of the current certificate is in the white list, if yes, to trigger the first authenticating unit; otherwise, to trigger the third sending module 18 to return the error response to the upper computer; and the first authenticating unit which is configured to authenticate the current certificate by using the public key in the upper computer temporary public key cache, to trigger the first extracting sub-module if the current certificate is authenticated successfully; to trigger the third sending module 18 to return the error response to the upper computer if the current certificate is authenticated unsuccessfully.

Preferably, in Embodiment 5, the authenticating and storing module further includes:
- an extracting and determining sub-module which is configured to extract the key parameter reference value from the current certificate, determine whether the key parameter reference value obtained from the key set is same as the key parameter reference value extracted from the current certificate, if yes, to trigger a determining and replacing sub-module; otherwise, to trigger the third sending module 18 to return the error response to the upper computer.

Preferably, in Embodiment 5, the fourth determining sub-module includes:
- a seventh determining unit which is configured to determine whether there exists the upper computer public key cache, if yes, to trigger an eighth determining unit; otherwise, to trigger the building and setting unit;
- the eighth determining unit which is configured to determine whether the type of the upper computer public key cache and the key length match with the key parameter reference value, if yes, to trigger the second storing sub-module; otherwise, to trigger the second building and setting unit; and
- the second building and setting unit which is configured to build the upper computer public key cache according to the curve parameter reference value, and to set the curve parameter according to the key parameter reference value stored in the key set, and to trigger the second storing sub-module.

Preferably, in Embodiment 5, in the case that the instruction received by the first receiving module is the internal authenticating instruction, the obtaining and generating module comprises:
- a fourth parsing and storing sub-module which is configured to parse the data field content of the internal authenticating instruction according to the current security level and store the parsed result into the receiving cache;
- a third obtaining sub-module which is configured to obtain the key version number and the key ID from the receiving cache:
- a fourth obtaining sub-module which is configured to obtain the control applet template which is consulted by the key and the upper computer temporary public key from the receiving cache:
- a fifth determining sub-module which is determine the type of the security channel protocol option, to trigger a generating and searching sub-module if the security channel protocol option is the first type; to trigger the second searching sub-module if the security channel protocol option is the second type;
- the generating and searching sub-module which is configured to generate the device temporary key pair, and to search for the public key of the upper computer itself according to the key version number and the key ID of the third obtaining sub-module;
- a first generating sub-module which is configured to generate a receipt according to the public key of the upper computer itself of the generating and searching sub-module, the private key of the device itself, the upper computer temporary public key of the fourth obtaining sub-module, the control applet template, the device temporary public key of the generating and searching sub-module;
- a second generating sub-module which is configured to generate the response data according to the receipt of the first generating sub module and the device temporary public key;
- the second searching sub-module which is configured to search for the public key of the upper computer itself according to the key version number and the key ID of the third obtaining sub-module;
- the third generating sub-module which is configured to generate the receipt according to the public key of the upper computer itself of the second searching sub-module, the private key of the device itself, the upper computer temporary public key of the fourth obtaining sub-module, the control applet template and the public key of the device itself;
- a fourth generating sub-module which is configured to generate the response data according to the receipt of the third generating sub-module and the public key of the device itself;
- a packaging sub-module which is configured to package the response data of the second generating sub-module or the response data of the fourth generating sub-module according to the current security level; and
- a fourth sending module 20 is specifically configured to return the data package of the packaging sub-module to the upper computer, and to trigger the first receiving module 10.

Preferably, in Embodiment 1, the first generating sub-module includes:

a first consulting unit which is configured to generate a first shared private key by the public key of the upper computer itself of the generating and searching sub-module consulting with the private key of the device itself, and to generate the second shared private key by the upper computer temporary public key of the fourth obtaining sub-module consulting with the device temporary private key generated by the generating and searching sub-module;

a first generating unit which is configured to generate shared information by using the derive algorithm according to the first shared private key and the second shared private key of the first consulting unit;

a second generating unit which is configured to generate a session key by using the preset algorithm according to the first shared private key and the second shared private key of the first consulting unit and the shared information generated by the first generating unit; and a third generating unit which is configured to generate receipt input data according to the key consulting reference control template of the fourth obtaining sub-module, the upper computer temporary public key and the device temporary public key of the generating and searching sub-module, and to generate a receipt according to the receipt input data and the session key of the second generating unit.

Preferably, in Embodiment 5, the third generating sub-module includes:

a second consulting unit which is configured to generate the first shared private key by using the public key of the upper computer itself of the second searching sub-module to consult with the private key of the device itself, and to generate the second shared private key by using the upper computer temporary public key of the fourth obtaining sub-module to consult with the private key of the device itself;

a fourth generating unit which is configured to generate the shared information by using the derive algorithm according to the first share private key of the second consulting unit and the second shared private key of the second consulting unit;

a fifth generating unit which is configured to generate the session key by using the preset algorithm according to the first shared private key, the second shared private key of the second consulting unit and the shared information of the fourth generating unit; and a sixth generating unit which is configured to generate the receipt input data according to the key consulting reference control template of the fourth obtaining sub-module, the upper computer temporary public key and the public key of the device itself, and to generate the receipt according to the receipt input data and the session key of the fifth generating unit.

In Embodiment 5, in the case that the instruction received by the first receiving module 10 is the mutually authenticating instruction, the obtaining and generating module 19 comprises;

a fifth parsing and storing sub-module which is configured to parse the data field content of the mutually authenticating instruction according to the current security level and to store a parsed result into the receiving cache;

a fifth obtaining sub-module which is configured to obtain the key version number and the key ID from the receiving cache:

a sixth obtaining sub-module which is configured to obtain the control applet template consulted by the key and the upper computer temporary public key from the receiving cache;

a third searching sub-module which is configured to search for the public key of the upper computer itself according to the key version number and the key ID of the fifth obtaining sub-module;

a fifth generating sub-module which is configured to generate the device temporary key pair;

a sixth generating sub-module which is configured to generate the receipt according to the public key of the upper computer itself of the third searching sub-module, the private key of the device itself, the upper computer temporary public key of the sixth obtaining sub-module, the control applet template, the device temporary public key of the fifth generating sub-module;

a seventh generating sub-module which is configured to generate the response data according to the receipt of the sixth generating sub-module and the device temporary public key of the fifth generating sub-module;

a packaging sub-module which is configured to package the response data of the seventh generating sub-module according to the current security level; and the fourth sending module 20 is specifically configured to return the data package of the packaging sub-module to the upper computer, and to trigger the first receiving module 10.

Preferably, in Embodiment 5, the sixth generating sub-module includes:

a third consulting unit which is configured to generate the first shared private key by using the upper computer temporary public key of the sixth obtaining sub-module and the private key of the device itself, and to generate the second share private key by using the upper computer temporary public key of the sixth obtaining sub-module to consult with the device temporary private key generated by the fifth generating sub-module;

a seventh generating unit which is configured to generate the shared information by using the derive algorithm according to the first shared private key and the second shared private key of the third consulting unit;

an eighth generating unit which is configured to generate the session key by using the preset algorithm according to the first shared private key, the second shared private key which are generated by the third consulting unit and the shared information generated by the seventh generating unit; and a ninth generating unit which is configured to generate the receipt input data according to the key consulting reference control template of the sixth obtaining sub-module, the upper computer temporary public key and the device temporary public key of the fifth generating sub-module, and to generate the receipt according to the receipt input data and the session key of the eighth generating unit.

In Embodiment 5, the device further comprises:

a storing and determining sub-module which is configured to store the data field content of the personalization instruction into the receiving cache in the case that the first receiving module receives the personalization instruction from the upper computer, to determine whether the current instruction is the last instruction of the current operation, if yes, to trigger the sixth sending module; otherwise, to trigger the sixth determining sub-module;

the sixth determining sub-module which is configured to determine the format of the current instruction, to trigger a seventh determining sub-module if the current instruction is the TLV format; otherwise, to trigger a ninth determining sub-module;

the seventh determining sub-module which is configured to determine whether all the data in the receiving cache is processed;

the eighth determining sub-module which is configured to determine the type of the current instruction when the seventh determining sub-module determines there is data which is not processed in the receiving cache, to trigger a first obtaining and storing sub-module in the case that the current instruction is a setting key information instruction; to trigger a second obtaining and storing sub-module in the case that the current instruction is a setting ECC curve parameter instruction; to trigger a building and setting and storing sub-module in the case that the current instruction is a setting ECC key pair instruction; and to trigger a third obtaining and storing sub-module in the case that the current instruction is a setting personalization data instruction;

the first obtaining and storing sub-module which is configured to obtain the key information from the receiving cache and store the key information, and to trigger the seventh determining sub-module;

the second obtaining and storing sub-module which is configured to obtain the curve parameter value from the receiving cache and store the curve parameter value into the curve parameter set, and to trigger the seventh determining sub-module;

the building and setting and storing sub-module which is configured to build ECC key object according to the parameter reference value in the setting ECC key pair instruction and the curve parameter value, and to read the key value from the receiving cache and set the key value into the ECC key object; to store the ECC key object into the key information object, and to trigger the seventh determining sub-module;

the third obtaining and storing sub-module which is configured to obtain the security field provider identification number and the security field serial number from the receiving cache and to store the security field provider identification number and the security field serial number, and to trigger the seventh determining sub-module;

the ninth determining sub-module which is configured to determine whether all the data in the receiving cache is processed;

a tenth determining sub-module which is configured to determine the type of the current operation in the case that the ninth determining sub-module determines that not all the data in the receiving cache is processed, to trigger the eleventh determining sub-module if the operation is a storing white list; to trigger the twelfth determining sub-module if the operation is an amending white list; to trigger the thirteenth determining sub-module if the operation is a storing upper computer root certificate; and to trigger the fifteenth determining sub-module if the operation is a setting device certificate;

the eleventh determining sub-module which is configured to determine whether there is a legitimate white list, if yes, to store the white list data in the receiving cache into the white list, and to trigger the ninth determining sub-module;

the twelfth determining sub-module which is configured to determine whether there is white list data in the receiving cache, if yes, to delete the white list and the stored public key, and to trigger the ninth determining sub-module; otherwise, to allot the storage space according to the length of the white list data, and store the certificate serial number which is in the receiving cache into the white list of the storage space, delete the stored public key, and to trigger the ninth determining sub-module;

the thirteenth determining sub-module which is configured to determine whether the upper computer root certificate in the receiving cache conforms to the preset requirement, if yes, to trigger a fourteenth determining sub-module;

the fourteenth determining sub-module which is configured to determine whether the current operation is processed, if yes, to trigger the seventh determining sub-module; otherwise, to trigger a seventh obtaining sub-module;

the seventh obtaining sub-module which is configured to obtain the upper computer root certificate provider identification and the length of the upper computer root certificate provider identification, and to trigger the fourteenth determining sub-module;

the fifteenth determining sub-module which is configured to determine whether the current operation is the certificate link instruction, if yes, to trigger a sixteenth determining sub-module;

the sixteenth determining sub-module which is configured to determine whether there is a legitimate certificate link, if yes, to trigger a seventeenth determining sub-module; otherwise, to build the certificate link, and to trigger a seventeenth determining sub-module;

the seventeenth determining sub-module which is configured to determine whether a temporary certificate needs to be built, if yes, to trigger a building and authenticating sub-module; otherwise, to trigger the ninth determining sub-module;

the building and authenticating sub-module which is configured to build the temporary certificate, and to use the public key of the current certificate in the certificate link to authenticate the temporary certificate, to add the temporary certificate into the certificate link in the case that the temporary certificate is authenticated successfully, and to trigger a checking and setting sub-module;

the checking and setting sub-module which is configured to check whether the key usage way of the temporary certificate is key consulted using, if yes, to trigger a first setting sub-module; otherwise, to trigger the seventeenth determining sub-module;

the first setting sub-module which is configured to set a personalization finish mark, and to trigger the seventeenth determining sub-module; and the sixth sending module which is further configured to return the response state code to the upper computer in the case that the storing and determining sub-module determine a result is no, the seventh determining sub-module determines a result is yes, the ninth determining sub-module determines a result is yes, to wait for receiving data, and to trigger the first receiving module; which is further configured to return the error response to the upper computer in the case that the eleventh determining sub-module determines a result is no, the thirteenth determining sub-module determines that a result is no, the fifteenth determining sub-module determines that a result is no, and the building and authenticating sub-module determines that a result is no.

Preferably, in Embodiment 5, the first obtaining and storing sub-module comprises:

a ninth determining unit which is configured to determine a character of a setting key information, to trigger a determining and building unit if the setting key information is a key type; to trigger a determining and allotting unit if the setting key information is a key byte length; to trigger a first obtaining and storing unit if the setting key information is a key ID; to trigger a first obtaining and building unit if the setting key information is a key parameter reference; to trigger a second obtaining and storing unit if the setting key information is a key obtaining way; to trigger a third obtaining and storing unit if the setting key information is a key access limit; and to trigger a first obtaining and searching unit if the setting key information is a key version number;

the determining and allotting unit which is configured to obtain the key length and the key type from the receiving cache, and determine whether the key type is a preset type, if yes, to allot storage space as the key storage area according to the key length, and to trigger the sixth determining sub-module; otherwise, to trigger a first allotting unit;

the first allotting unit which is configured to allot the storage space as the curve parameter storage area according to the key length, and to trigger the sixth determining sub-module;

the first obtaining and storing unit which is configured to obtain the key ID from the receiving cache and store the key ID into the key object, and to trigger the sixth determining sub-module; the first obtaining and building unit which is configured to obtain the key parameter reference value from the receiving cache, and build a curve parameter set according to the parameter reference value, and to trigger the sixth determining sub-module;

the second obtaining and storing unit which is configured to obtain the key usage way from the receiving cache and store the key usage way into the key object, and to trigger the sixth determining sub-module;

the third obtaining and storing unit which is configured to obtain the key access limit from the receiving cache and store the key access limit into the key object, and to trigger the sixth determining sub-module;

the first obtaining and checking unit which is configured to obtain the key version number from the receiving cache, and to search from a corresponding key set from the key cluster according to the key version number;

a tenth determining unit which is configured to determine whether the found key set is empty, if yes, to trigger the third obtaining unit; otherwise, to trigger the first setting unit; the third obtaining unit which is configured to obtain a default key set from the receiving cache;

an eleventh determining unit which is configured to determine whether the obtained version number of the key set is a first preset version number, if yes, to trigger a first updating unit; otherwise, to trigger a building and adding unit;

the first updating unit which is configured to update the version number of the key cluster as the key version number, and to trigger a first setting unit;

the building and adding unit which is configured to build a new key set and add the key set into the key cluster, and to trigger a first setting unit;

the first setting unit which is configured to set the key usage way and the key access limit in the key information object; and the second setting unit which is configured to set the key information object into the key set corresponding to the key ID, and to trigger the sixth determining sub-module.

Preferably, in Embodiment 5, the eleventh determining sub-module comprises:

a twelfth determining unit which is configured to determine whether the current security channel protocol option is a preset protocol type, if yes, to trigger a thirteenth determining unit; otherwise, to trigger the sixth sending module to return the error response to the upper computer;

the thirteenth determining unit which is configured to determine whether there is the white list counter value in the receiving cache, if yes, to trigger a fourth obtaining unit; otherwise, to trigger the sixth sending module to return the error response to the upper computer:

the fourth obtaining unit which is configured to obtain the white list counter value from the receiving cache;

the fourteenth determining unit which is configured to determine whether the white list counter value is more than the recorded number of white lists, if yes, to trigger a fifth determining unit; otherwise, to trigger the sixth sending module to return the error response to the upper computer; and the fifteenth determining unit which is configured to determine whether there exists a white list which is can be used, if yes, to obtain the white list data from the receiving cache and store the white list data into the white list, trigger the sixth determining sub-module; otherwise, to trigger the sixth sending module to return the error response to the upper computer.

Preferably, in Embodiment 5, the twelfth determining sub-module comprises:

a sixteenth determining unit which is configured to determine whether there is white list data in the receiving cache, if yes, to trigger a first allotting unit; otherwise, to trigger a first deleting unit;

the first deleting unit which is configured to delete the stored white list, and to trigger a second deleting unit;

the first allotting unit which is configured to allot storage space according to the length of the white list data;

a fourth obtaining and storing unit which is configured to obtain the certificate serial number from the receiving cache and store the certificate serial number into the white list of the storage space, and to trigger a second deleting unit;

the second deleting unit which is configured to delete the stored public key; and a second updating unit which is configured to update the record number of white lists with the white list counter value in the receiving cache, and to trigger the sixth determining sub-module.

Preferably, in Embodiment 5, the seventh obtaining sub-module includes:

a seventeenth determining unit which is configured to determine the type of the continued operation, to trigger the first obtaining and determining unit if the continued operation is obtaining length of upper computer root certificate issuer identification; to trigger the second obtaining and determining unit if the continued operation is obtaining upper computer root certificate issuer identification;

a first obtaining and determining unit which is configured to obtain the length of the upper computer root certificate issuer identification from the receiving cache, and to determine whether the length of the upper computer root certificate issuer identification is in the preset scope, if yes, to trigger a first storing unit; otherwise, to trigger the sixth sending module to return the error response to the upper computer;

the first storing unit which is configured to store the length of the upper computer root certificate issuer identification, and to trigger the fourteenth determining sub-module;

the second obtaining and determining unit which is configured to obtain the key information length value from the receiving cache, and determine whether the key information length value meets with the requirement, if yes, to trigger a fifth obtaining unit; otherwise, to trigger the sixth sending module to return the error response to the upper computer;

the fifth obtaining unit which is configured to obtain the key ID and the key version number from the receiving cache and store the key ID and the key version number;

an eighteenth determining unit which is configured to determine the key version number is in the preset duration, if yes, to trigger a fourth searching unit; otherwise, to trigger the sixth sending module to return the error response to the upper computer;

the fourth searching unit which is configured to search for the corresponding key set from the preset key cluster according to the key version number, to trigger a fifth searching unit if the corresponding key set is found; to trigger a seventh obtaining unit if the corresponding key set is not found;

the seventh obtaining unit which is configured to obtain the default key set from the preset key cluster, and to trigger the fifth searching unit;

the fifth searching unit which is configured to search for key information from the key set according to the key ID, to trigger a nineteenth determining unit if the key information is found; to trigger the sixth sending module to return the error response to the upper computer if the key information is not found;

the nineteenth determining unit which is configured to determine whether the current instruction is processed completely, if yes, to trigger the ninth determining sub-module; otherwise, to trigger a fourth obtaining and storing unit; and the fourth obtaining and storing unit which is configured to obtain the upper computer root certificate issuer identification from the receiving cache according to the length of the upper computer root certificate issuer identification and store the upper computer root certificate issuer identification corresponding to the key information, and to trigger the fourteenth determining sub-module.

Preferably, in Embodiment 5, the sixth determining sub-module includes:

a twentieth determining unit which is configured to determine whether the stored key ID and the key version number is legitimate, if yes, to trigger a sixth searching unit; otherwise, to trigger the sixth sending module to return the error response to the upper computer;

the sixth searching unit which is configured to search for a corresponding certificate link from the certificate storage area according to the key ID and the key version number, to trigger a seventeenth determining sub-module if the corresponding certificate link is found; otherwise, to trigger a first building unit; and the first building unit which is configured to build a new certificate link according to the key ID and the key version number which are stored, and to trigger the sixteenth determining sub-module.

Preferably, in Embodiment 5, the building and authenticating sub-module includes:

a first obtaining and reading unit which is configured to obtain the temporary certificate data from the receiving cache and to build the temporary certificate according to the read temporary certificate data:

a twenty-first determining unit which is configured to obtain the current certificate from the certificate link and determining whether the current certificate is obtained successfully, if yes, to trigger a third authenticating unit; otherwise, to trigger a seventh checking unit;

the seventh checking unit which is configured to check whether the key usage way of the temporary certificate is the signature usage, if yes, to trigger an adding unit; otherwise, to trigger the sixth sending module to return the error response to the upper computer;

the third authenticating unit which is configured to authenticate the temporary certificate by using the current certificate, to trigger an adding unit is the temporary certificate is authenticated successfully; to trigger the sixth sending module to return the error response to the upper computer if the temporary certificate is authenticated unsuccessfully; and the adding unit which is configured to add the temporary certificate, the key ID and the key version number into the certificate link.

Preferably, in Embodiment 5, the first setting sub-module is specifically configured to set the personalization finish mark according to the key ID, and amend the default value of SCP field in the card data as the personalization finish mark, and to trigger a seventeenth determining sub-module.

In Embodiment 5, the packaging sub-module includes:

a twenty-second determining unit which is configured to determine the current security level, to trigger a first calculating and composing unit if the current security level is the plaintext level; and to trigger a second calculating and composing unit if the current security level is the ciphertext level;

the first calculating and composing unit which is configured to calculate mac value according to the data in the response cache, compose the data in the response cache and mac value to obtain the response data; and the second calculating and composing unit which is configured to calculate mac value according to the data in the cache, and to encrypt all the data in the cache to obtain an encrypted result, and to compose the encrypted result and the mac value to obtain the response data.

The Embodiments discussed above are those preferable ones of the present invention, not used to limit the scope of protection of the present invention. On the basis of the above disclosed Embodiments of the invention, those variant or substitute Embodiments easily made by those skilled in the art without any inventive work belong to the scope of the invention. Therefore, the scope of protection of the present invention will be defined by the appended claims.

The invention claimed is:

1. A method for building a security channel for updating of an applet of a digital currency hardware wallet, wherein the method comprises the following steps:

S1) determining, by a hardware wallet, a type of an instruction when the instruction is received from an upper computer, executing Step S2 in the case of the instruction is an obtaining data instruction; executing Step S5 in the case of the instruction is an executing security operation instruction; executing Step S6 in the case of the instruction is an authenticating instruction; and executing Step S7 in the case of the instruction is an applet updating instruction;

S2) determining a type of data which is obtained according to the obtaining data instruction, executing Step S3 in the case of the data is an obtaining key information; and executing Step S4 in the case of the data is an obtaining device certificate information;

S3) obtaining a key version and a key identification from a corresponding key set according to a key set identification in the obtaining data instruction, storing the key version and the key identification, and returning the key version and the key identification to the upper computer, then returning to Step S1;

S4) searching for a corresponding certificate set according to a certificate set identification in the obtaining data instruction, traversing a superior certificate in the certificate set to find a root certificate, storing in sequence certificate contents of all the certificates which starts from the root certificates, and returning the certificate contents of all the certificates to the upper computer, then returning to Step S1;

S5) obtaining a public key of the upper computer itself and a certificate serial number from the executing security operation instruction, obtaining an upper computer certificate corresponding to the certificate serial number, authenticating the upper computer certificate via the public key of the upper computer itself, storing an upper computer key in the case of the upper computer certificate is authenticated successfully, and returning a successful response to the upper computer, then returning to Step S1; returning an error information to the upper computer in the case of the upper computer certificate is authenticated unsuccessfully;

S6) obtaining the public key of the upper computer itself according to a key version number and a key ID in the authenticating instruction, generating a receipt according to an upper computer temporary public key, the public key of the upper computer itself and the generated session key which are in the authenticating instruction, and returning the receipt to the upper computer, then returning to Step S1; and S7) decrypting an applet data ciphertext in the applet updating instruction by means of the session key, updating applet data which is stored by means of the applet data which is obtained after the encryption, and returning updating successful information to the upper computer, then returning to Step S1.

2. The method as claimed in claim 1, wherein the Step S3 comprises the following steps:

S31) parsing data field content of the received obtaining data instruction according to a current security level, and storing a parsed result into a receiving cache;

S32) determining whether data in the receiving cache is legitimate, if yes, executing Step S33; otherwise, returning an error response to the upper computer;

S33) obtaining a key set identification from the receiving cache, searching for a corresponding key set from a key storage area according to the key set identification, executing Step S34 in the case of the corresponding key set is found; otherwise, returning the error response to the upper computer; and S34) obtaining the key version and the key identification from the key set, storing the key version and the key identification into a response cache, packaging the data in the response data according to the security level, and returning the packaged data to the upper computer, then returning to Step S1.

3. The method as claimed in claim 1, wherein the Step S4 comprises the following steps;

S41) parsing the data field content of the received obtaining data instruction according to the current security level, storing a parsed result into a receiving cache, and determining whether the data in the receiving cache is legitimate, if yes, executing Step S42; otherwise, returning the error response to the upper computer;

S42) obtaining a certificate set identification from the receiving cache, searching for a corresponding certificate set from the certificate storage area according to the certificate set identification, executing Step S43 in the case of the corresponding certificate set is found; otherwise, returning the error response to the upper computer; and S43) traversing superior certificates in the certificate set to find a root certificate, and storing the certificate content one by one of all the certificates which starts from the root certificate into the response cache, packaging the data in the response cache according to the security level and returning the data to the upper computer, then returning to Step S1.

4. The method as claimed in claim 1, wherein the Step S5 comprises the following steps;

S5-0) parsing the data field content in the executing security operation instruction according to the current security level, and storing a parsed result into a receiving cache, and obtaining the key version number and the key ID from the receiving cache;

S5-1) searching for a corresponding key set from the key storage area according to the key ID and the key version number, executing Step S5-3 in the case of the corresponding key set is found; while executing Step S5-2 in the case of the corresponding key set is not found;

S5-2) obtaining a preset default key set from the key storage area, and executing Step S5-3;

S5-3) determining whether a legitimate upper computer temporary public key cache exists according to the obtained key set, if yes, executing Step S5-4; otherwise, returning an error response to the upper computer;

S5-4) storing an upper computer root public key in the receiving cache into the upper computer temporary public key cache;

S5-5) storing part of the current certificate in the receiving cache, determining whether the current certificate is obtained completely, if yes, executing Step S5-6;

otherwise, returning a response state code to the upper computer, then returning to Step S1;

S5-6) authenticating the stored current certificate by means of the public key in the upper computer temporary public key cache, executing Step S5-7 in the case of the current certificate is authenticated successfully; while returning an error response to the upper computer if the current certificate is authenticated unsuccessfully;

S5-7) extracting the public key of the upper computer itself from the current certificate;

S5-8) determining whether there exists any certificate which is not received, if yes, executing Step S5-9; otherwise, replacing the public key in the upper computer temporary public key cache with the public key of the upper computer itself, and returning the response state code to the upper computer, then returning to Step S1;

S5-9) determining whether there exists a legitimate upper computer public key cache, if yes, executing Step 35-10; otherwise, building a legitimate upper computer temporary public key cache, then executing Step S5-10, and S5-10) storing the obtained public key of the upper computer itself into the upper computer public key cache, and returning the response state code to the upper computer, then returning to Step S1.

5. The method as claimed in claim 1, wherein in the case that the type of the instruction is an internal authenticating instruction in Step S1 Step S6 comprises the following steps:

S6-11) parsing the data field content of the internal authenticating instruction according to a current security level, and storing a parsed result into the receiving cache, and obtaining the key version number and the key ID from the receiving cache;

S6-12) obtaining a control applet template consulted by the keys from the receiving cache and the upper computer temporary public key;

S6-13) determining a type of a security channel protocol option, executing Step S6-14 in the case of the type is a first type; while executing Step S6-17 in the case of the type is a second type;

S6-14) generating a device temporary key pair, and searching for the public key of the upper computer itself according to the key version number and the key ID;

S6-15) generating the receipt according to the public key of the upper computer itself, the private key of the device itself, the upper computer temporary public key, the control applet template, and the device temporary public key;

S6-16) generating response data according to the receipt and the device temporary public key, packaging the response data according to the current security level, and returning the data to the upper computer, then returning to Step S1;

S6-17) searching for the public key of the upper computer itself according to the key version number and the key ID;

S6-18) generating the receipt according to the public key of the upper computer itself, the private key of the device itself, the upper computer temporary public key, the control applet template, and the public key of the device itself; and S6-19) generating the response data according to the receipt and the public key of the device itself, and packaging the response data according to the current security level and returning the response data to the upper computer, then returning to Step S1.

6. The method as claimed in claim 1, wherein in the case that the type of the instruction is determined as the mutual verifying instruction in Step S1, Step S6 includes the following steps:

S6-21) parsing the data field content of the instruction according to the current security level, and storing a parsed result into a receiving cache, and obtaining the key version number and the key ID from the receiving cache;

S6-22) obtaining the control applet template consulted by the key and the upper computer temporary public key from the receiving cache;

S6-23) searching for the public key of the upper computer itself according to the key version number and the key ID; generating the device temporary key pair, and generating the receipt according to the public key of the upper computer itself, the private key of the device itself, the upper computer temporary public key, the control applet template, and the device temporary public key; and S6-24) generating the response data according to the receipt and the device temporary public key, and packaging the response data according to the current security level, and returning the packaged data to the upper computer, then returning to Step S1.

7. The method as claimed in claim 1, wherein the method further comprises the following steps:

H1) storing, by the hardware wallet, the data field content in a personalization instruction into the receiving cache when the personalization instruction is received from the upper computer, determining whether the current instruction is the last instruction of the current operation, if yes, returning the response state code to the upper computer, and waiting for receiving data, then returning to Step H1; otherwise, executing Step H2;

H2) determining a format of the current instruction, executing Step H3 in the case of the format is TLV format; otherwise, executing Step H9;

H3) determining whether all the data in the receiving cache is processed, if yes, returning the response state code to the upper computer, and waiting for receiving data, then returning to Step H1; otherwise, executing Step H4;

H4) determining the type of the current instruction, executing Step H5 in the case of the current instruction is a setting key information instruction; executing Step H5 in the case of the current instruction is a setting ECC curve parameter instruction;

executing Step H7 in the case of the current instruction is a setting ECC key pair instruction; and executing Step H8 in the case of the current instruction is a setting personalization data instruction;

H5) obtaining key information from the receiving cache, and storing the key information, then returning to Step H3;

H6) obtaining a curve parameter value from the receiving cache, and storing the curve parameter value into a curve parameter set, then returning to Step H3;

H7) building ECC key object according to the parameter reference value and the curve parameter value in the setting ECC key pair instruction, reading the key value from the receiving cache and setting the key value into the ECC key object; storing the ECC key object into the key information object, then returning to Step H3;

H8) obtaining a security field provider identification number and a security field serial number from the receiving cache, and storing the security field provider identification number and the security field serial number, then returning to Step H3;

H9) determining whether all the data in the receiving cache is processed, if yes, returning the response state code to the upper computer, and waiting for receiving data, then returning Step H1; otherwise, executing Step H19;

H10) determining a type of the operation according to the current instruction, executing Step H11 in the case of the operation is a storing white list; executing Step H12 in the case of the operation is an amending white t; executing Step H13 in the case of the operation is a storing upper computer root certificate; and executing Step H16 in the case of the operation is a setting device certificate;

H11) determining whether there exists any legitimate white list, if yes, storing the white list data in the receiving cache into the white list, then returning to Step H9; otherwise, returning an error response to the upper computer;

H12) determining whether there exists any white list data in the receiving cache, if yes, deleting the white list and the stored public key, then returning to Step H9; otherwise, allotting a storage area according to a length of the white list data, and storing a certificate serial number in the receiving cache into the white list of the storage space, and deleting the stored public key, then returning to Step H9;

H13) determining whether the upper computer root certificate in the receiving cache meets a preset requirement, if yes, executing Step H14; otherwise, returning an error response to the upper computer;

H14) determining whether the current instruction is completely processed, if yes, returning Step H3; otherwise, executing Step H15;

H15) obtaining an upper computer root certificate provider identification and a length of the upper computer root certificate provider identification, then returning to Step H14;

H16) determining whether the current instruction is a certificate link instruction, if yes, executing Step H17; otherwise, returning an error response to the upper computer;

H17) determining whether there exists any legitimate certificate link, if yes, executing Step H18; otherwise, building a certificate link and executing Step H18;

H18) determining whether t needs to building a temporary certificate, if yes, executing Step H19; otherwise, returning to Step H9;

H19) building a temporary certificate, and authenticating the temporary certificate by means of the public key of the current certificate in the certificate link, adding the temporary certificate into the certificate link in the case of the temporary certificate is authenticated successfully, and executing Step H20; otherwise, returning an error response to the upper computer;

H20) checking whether a key consultation way of the temporary certificate is a key consultation use, if yes, setting a personalization finish mark, then returning to Step H18; otherwise, returning to Step H18.

8. The method as claimed in claim 7, wherein the Step H15 includes the following steps:

H5-1) determining a character of a setting key information, executing Step H5-2 in the case of the setting key information is a key type; executing Step H5-3 in the case of the setting key information is a key byte length; executing Step H5-5 in the case of the setting key information is key ID; executing Step H5-6 in the case of the setting key information is a key parameter reference value; executing Step H5-7 in the case of the setting key information is a key obtaining way; executing Step H5-8 in the case of the setting key information is a key visit limit; and executing Step H5-9 in the case of the setting key information is the key version number;

H5-2) obtaining the key type from the receiving cache, and determining whether the key type is a preset type, if yes, building a key information object, and returning Step H3; otherwise, waiting for receiving data, then returning to Step S1;

H5-3) obtaining the key length and the key type from the receiving cache, and determining whether the key type is a preset type, if yes, allotting a storage area as the key storage area according to the key length, and returning to Step H3; otherwise, executing Step H5-4;

H5-4) allotting a storage space as a curve parameter storage area according to the key length, and returning to Step H3;

H5-5) obtaining the key ID from the receiving cache and storing the key ID into a key object, and returning to Step H3;

H5-6) obtaining the key parameter reference from the receiving cache, and building a curve parameter set according to the key parameter reference, then returning to Step H3;

H5-7) obtaining the key usage way from the receiving cache and storing the key usage way into the key object, then returning to Step H3;

H5-8) obtaining the key access limit from the receiving cache and storing the key access limit into the key object, then returning to Step H3;

H5-9) obtaining the key version number from the receiving cache, searching for a corresponding key set from a key cluster according to the key version number;

H5-10) determining whether the found key set is empty, if yes, executing Step H5-11; otherwise, executing Step H5-15;

H5-11) obtaining the default key set from the receiving cache;

H5-12) determining whether the version number of the obtained key set is the first preset version number, if yes, executing Step H5-13; otherwise, executing Step H5-14;

H5-13) updating the version number of the key set as the key version number, and executing Step H5-15;

H5-14) building a new key set and adding the key set into the key cluster, and executing Step H5-15;

H5-15) setting the key usage way and the key access limit which are in the key information object; and H5-16) setting the key information object into the key set corresponding to the key ID, and returning to Step H3.

9. The method as claimed in claim 7, wherein the Step H11 includes the following steps:

H11-1) determining whether the current security channel protocol option is a preset protocol type, if yes, executing Step H11-2; otherwise, returning an error response to the upper computer;

H11-2) determining whether there exists any white list counter value in the receiving cache, if yes, executing Step H11-3; otherwise, returning an error response to the upper computer;

H11-3) obtaining the white list counter value from the receiving cache;

H11-4) determining whether the obtained white list counter value is more than a recorded number of white lists, if yes, executing Step H11-5, otherwise, returning an error response to the upper computer; and H11-5) determining whether there is any white list which can be used, if yes, obtaining white list data from the receiving cache and storing the white list data into the white list, then returning to Step H3; otherwise, returning an error response to the upper computer.

10. The method as claimed in claim 7, wherein the Step H12 comprises the following steps:
- H12-1) determining whether there is any white list data in the receiving cache, if yes, executing Step H12-3; otherwise, executing Step H12-2;
- H12-2) deleting the stored white list, and executing Step H12-5;
- H12-3) allotting a storage space according to a length of the white list data;
- H12-4) obtaining the certificate serial number from the receiving cache and storing the certificate serial number into the white list of the storage space;
- H12-5) deleting the stored public key; and
- H12-6) updating the recorded number of the white lists with the white list counter value in the receiving cache, and returning to Step H3.

* * * * *